United States Patent [19]

Ricciardi et al.

[11] 4,054,784
[45] Oct. 18, 1977

[54] WEIGH FEEDER SYSTEM

[76] Inventors: Ronald J. Ricciardi, 108 Malcolm Ave., Garfield, N.J. 07026; Angelo Ferrara, 7 Bryn Mawr Way, Fairfield, N.J. 07006; Joseph L. Hartmann, 85 Hillside Ave., West Caldwell, N.J. 07006

[21] Appl. No.: 678,391

[22] Filed: Apr. 19, 1976

Related U.S. Application Data

[63] Continuation-in-part of Ser. No. 587,869, June 18, 1975.

[51] Int. Cl.² ................................. G01G 11/04
[52] U.S. Cl. ....................... 364/479; 177/105; 222/58; 222/55; 364/581
[58] Field of Search ............ 235/151.33, 151.34; 222/52, 55, 59, 71, 77, 58; 177/105

[56] References Cited

U.S. PATENT DOCUMENTS

| | | | |
|---|---|---|---|
| 3,329,313 | 7/1967 | Mayer | 222/58 |
| 3,724,720 | 4/1973 | Bullivant | 222/55 |
| 3,855,458 | 12/1974 | Motter et al. | 235/151.34 |
| 3,889,848 | 6/1975 | Ricciardi et al. | 177/105 X |

Primary Examiner—Edward J. Wise
Attorney, Agent, or Firm—Edwin T. Grimes

[57] ABSTRACT

Disclosed herein is an automatically controlled weigh feeding apparatus including a container prefilled with a substance, a device for discharging the substance from the container at a controllable rate, apparatus for weighing the container and its contents and for producing an electrical signal proportional to that weight, a first amplifier for amplifying the electrical signal, a first analog-digital converter coupled to said first amplifier and a digital computer coupled to said first analog-digital converter for computing the weight of substance remaining in the container. A second amplifier is coupled to said first amplifier and a ramp off-set circuit which is controlled by the digital computer inputs a second signal to the second amplifier means having a controlled stepping output applied as a second input signal to the second amplifier to maintain the output of the second amplifier within a given selected range of amplitude during one time cycle of operation. A second analog-digital converter interposed between the second amplifier and the digital computer. The digital computer is adapted to compute a corrective signal based on the signal received for controlling the discharge of the substance from the container.

20 Claims, 16 Drawing Figures

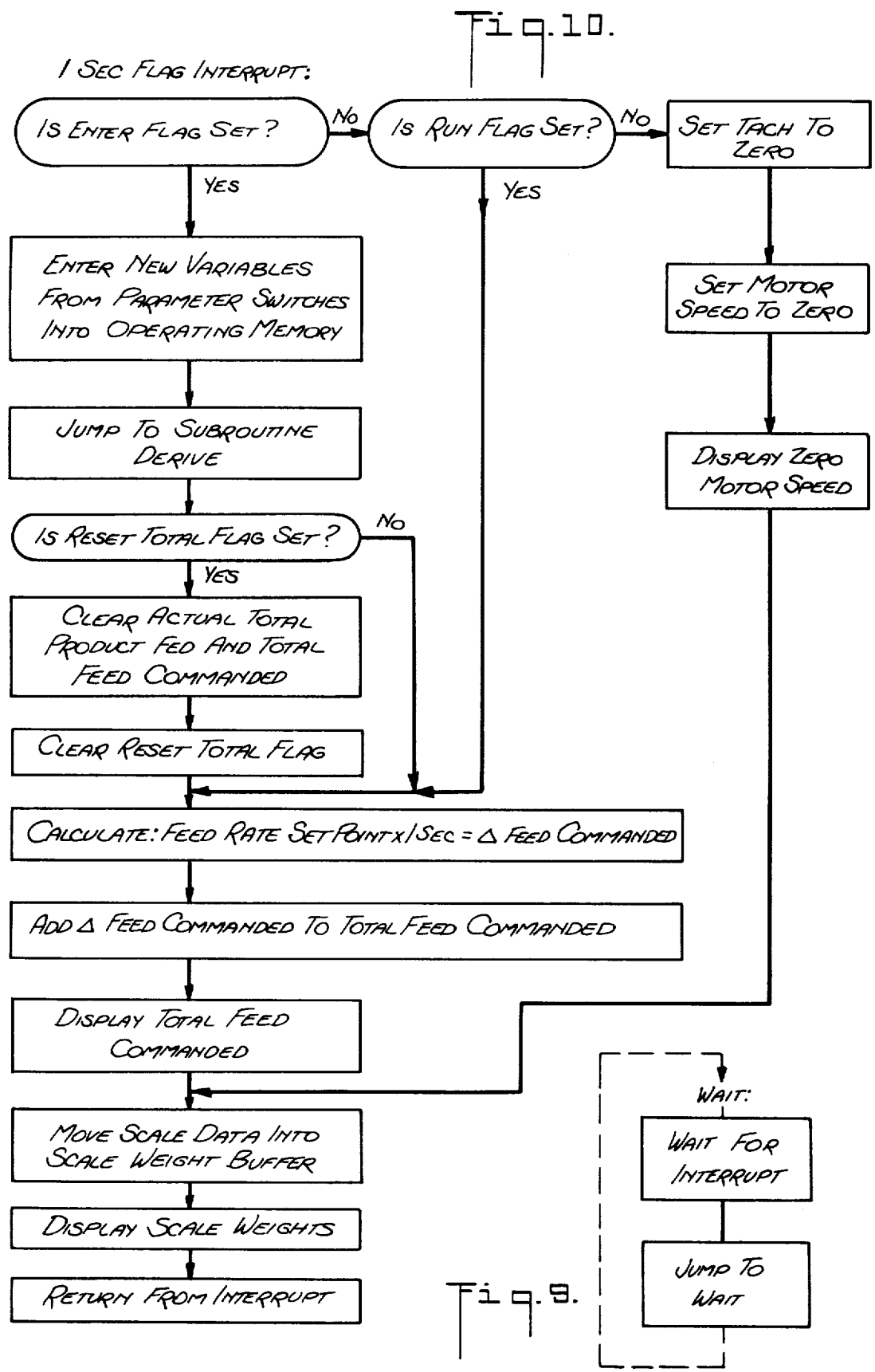

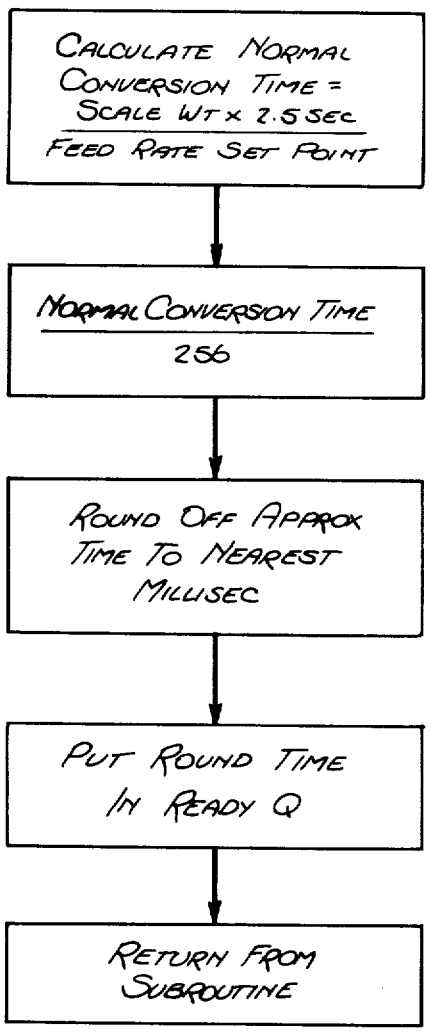
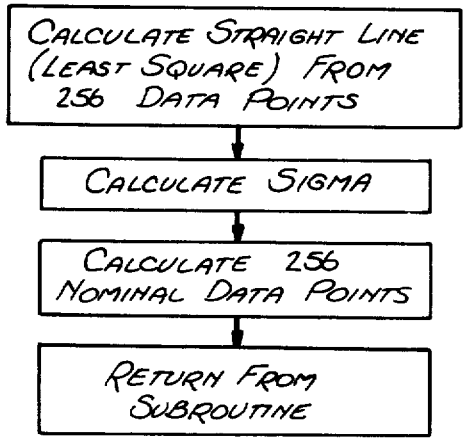
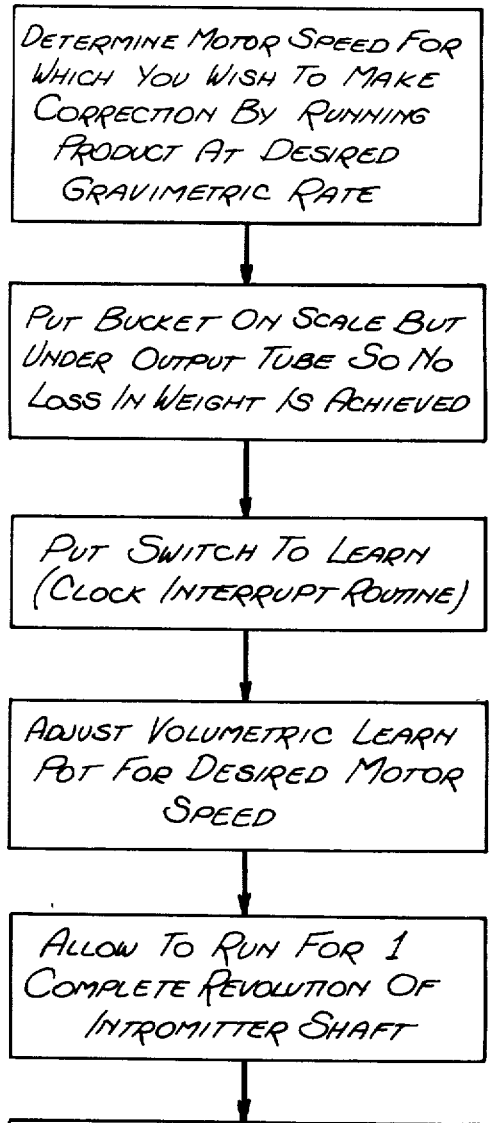

WEIGH FEEDER SYSTEM

This application is a Continuation-in-Part of our co-pending application Ser. No. 587,869, filed June 18, 1975.

This invention relates to weigh feeding systems and it is particularly applicable to apparatus for feeding fluid-like material. Systems constructed according to the present invention are particularly adapted, among other possible uses, for accurately weigh feeding a wide variety of substances including dry materials regardless of whether the material is free-flowing, sluggish, or pressure sensitive; and ranging from amorphous powders to flakes, pellets, chunks and even fibers, as well as liquids.

Various control weigh feeding systems have been known in the past, as for example, the system disclosed in U.S. Patent Application Ser. No. 345,587, filed Mar. 28, 1973. In accordance with this application, there is provided a weigh feeding apparatus wherein the discharge rate of a fluid substance from a container is maintained at a predetermined constant value. The container and its contents are weighed, and an electrical signal is produced which signal has an amplitude proportional to the weight of the container and its contents. This electrical signal, which varies as the contents of the container are discharged, is differentiated and applied to a comparator circuit together with a reference signal, wherefore the output of the comparator circuit may be used to control said discharge rate of the substance as it is fed from the container. The comparator output is applied to a signal generator for producing a motor drive signal for a DC motor having its output shaft connected to drive a device for discharging the substance from the container. The signal generator may comprise a pulsing circuit for controlling a pair of SCR's which are disposed in a rectifying bridge circuit connected between an AC voltage source and the input of the DC motor. Accordingly, the speed of the motor is controlled by the pulsing circuit, which, in turn, is controlled by the algebraic sum of the output signal of a tachometer generator which is coupled directly to the motor shaft, and output signal from the comparator. It can be stated that the above-described apparatus provides an accurate weigh feeding system, whereby the feeding rate may be maintained at a constant value, and wherein the predetermined feeding rate may be adjusted by adjusting the value of the reference signal source.

Additionally, the output of the weighing device may be applied to a pair of differential amplifier circuits, along with a pair of reference voltage inputs, for determining when the contents of the container varies above and below desired maximum and minimum fill levels for the container. That is, circuitry is provided for automatically refilling the container when the weight of the substance therein reaches the desired minimum weight, and for terminating the filling process for the container when the fluid substance therein reaches the desired maximum weight. Such circuitry includes means for maintaining the discharge rate of the container at a constant rate equal to the instantaneous rate thereof immediately preceding energization of the filling device for the container. Particularly, the pair of differential amplifier circuits are coupled to a pair of relay driver circuits for controlling a relay circuit to energize the filling device when the substance in the container reaches the minimum weight, and for maintaining that filling device in an energized state until the container is refilled to its maximum desired level. The relay circuit is also coupled to the comparator circuit, for controlling the latter to produce a constant output during the refilling process for the container, thereby maintaining the discharge rate of the container at the value of the particular discharge rate thereof immediately preceding energization of the filling device.

As pointed out in said patent application, Ser. No. 345,587, in certain installations there exists a possibility of physical forces impinging upon the weigh feeder from an external source, such as wind or air currents, physical contact with the weigh feeder by operating personnel, or the like, for example. These forces cause the weigh feeder to move at a rate that is other than that resulting from the linear discharge of the contents of the container. Because such additional movement, i.e. acceleration, is an error and has no direct relationship to the actual discharge of material from the container, the control system could continue to perform its corrective function utilizing the erroneous output signal for comparison with the fixed set point reference signal derivative. The aforementioned patent application discloses one means for preventing such excessive and abnormal movements of the weigh feeder scale from grossly affecting or disturbing the normal operation of the system to thereby prevent large excursions of the output feed rate.

The present invention is directed to new improved means for accomplishing the foregoing objectives, as well as additional objectives, as will become apparent as the description proceeds.

Another feature of the present invention resides in the provision of a new and improved weigh feeder system, which is capable of controlling more operating parameters, which operates faster, which provides a faster responsive action, and which is more accurate as compared to the prior art systems. In addition, the feeder system of the present invention has a memory and is capable of taking into account past errors in the material flow rate and taking corrective action with respect thereto.

Also, the system is capable of disregarding single extraneous material flow rate readings, which may be caused by such factors as noise, vibrations, or the like, for example.

In one form of the invention, we provide a new and improved weigh feeding apparatus characterized by a container for a prefilled substance having means for discharging the substance therefrom at a controllable rate. A scale system is provided for weighing the container prefilled with the substance and an electrical circuit serves to produce a first electrical signal proportional in amplitude to the weight, and a high gain amplifier amplifies the electrical signal. An analog-digital converter (ADC) is coupled to the amplifier and a digital computer is adapted to receive pulse signals from the ADC for computing and outputting a signal corresponding to the signal received. Digital-analog converter ramp offset means which is controlled by the computer outputs a controlled stepping signal, that is applied as a second input to the amplifier means to algebraically combine therewith. Each step corresponds to one time cycle of operation, thereby maintaining the output of the amplifier in a given preselected range of amplitude during one time cycle of operation. The digital computer as another operation thereof computes a corrective signal based on the signal received, and means coupled between the computer and the means for discharging the substance from the container, serve to control the rate of discharge responsive to the corrective signal.

According to one aspect of the invention, the weigh feeder apparatus further comprises means for inputting into the digital computer a preselected feed rate, and the computer is adapted to store in memory a series of signals received from the ADC for each of the time cycles of operation and compute a corrective signal by comparing the signals received with the preselected feed rate. According to another aspect of the invention, the weight feeding apparatus further comprises an underweight limit input means to the computer and an overweight limit input means thereto. The computer, as one operation thereof, causes an underweight or an overweight light to energize when an underweight or an overweight condition exists for longer than some preset period of time. Further, according to another aspect of the invention, the digital computer computes the corrective signal, while disregarding a preselected number of the signals received from the ADC, which exceed a set limit during one time cycle of operation, when computing the corrective signal.

The invention provides, according to another form thereof, a new and improved weigh feeding apparatus which is characterized by a container for a prefilled substance and means for discharging the substance from the container at a controllable rate of weight loss. A scale is provided for weighing the container prefilled with the substance and an electrical circuit is coupled to the weighing means for producing a first electrical signal proportional in amplitude to the weight determined by the weighing means. A first amplifier amplifies the electrical signal and a first analog-digital converter (ADC) is coupled to the first amplifier and outputs binary words to a digital computer coupled thereto. The digital computer, as one operation thereof, computes a first output signal corresponding to the weight of the substance in the container. A second amplifier amplifies a signal received from the first amplifier and a second ADC is coupled to the second amplifier and outputs a binary word signal to the digital computer. Digital-analog converter ramp offset means are provided which receive a signal from the digital computer and outputs a controlled stepping output which is algebraically combined with the input to the second amplifier, each step corresponding to one time cycle of operation, thereby to maintain the output of the second amplifier in a given preselected range of amplitude during one time cycle of operation. An input switch is provided to apply a preselected feed rate value to the computer. The computer, as another operation thereof, stores in memory a series of said signals received from the second ADC for each of the time cycles of operation and computes a corrective signal by comparing the signals received with the preselected feed rate value. Coupling means interconnect the computer and the means for discharging the substance from the container, whereby the corrective signal serves to control the rate of discharge of the substance from the container. A shaft encoder is coupled to the computer to allow vibration signals generated from the rotating machinery mounted on the scale to be corrected for in the computation of the feed rates.

In still another form of the invention there is provided a weigh feeding apparatus which includs a container for a prefilled substance, means for discharging the substance from the container at a controllable rate, means for weighing the container prefilled with the substance, and means coupled to the weighing means for producing electrical signals proportional to the weight determined by the weighing means. In addition, the apparatus further includes an analog-digital converter for receiving the electrical signals, digital computer means coupled to the analog-digital converter for computing a corrective signal based on the signals received, and means coupled between the computer means and the means for discharging the substance from the container for controlling the rate of discharge responsive to the corrective signal. Further, this weigh feeding apparatus comprises, means for inputting into the computer means a preselected feed rate, said computer means being adapted to store a series of the signals received from the analog-digital converter for a time cycle of operation and computing said corrective signal by comparing the signals received with the preselected feed rate, and said computer being further adapted to maintain the corrective signal constant during the time when a preselected number of the signals received from the analog-digital converter exceeds preselected upper or lower limits, during one time cycle of operation.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis of the designing of other structures for carrying out the various purposes of the invention. It is important, therefore, that this disclosure be regarded as including such equivalent constructions and methods as do not depart from the spirit and scope of the invention.

One embodiment of the invention has been chosen for purposes of illustration and description, and is shown in the accompanying drawings forming a part of the specification, wherein:

FIG. 9 is a flow chart of the wait subroutine;

FIG. 10 is a flow chart of the one second interrupt display subroutine;

FIG. 11 is a flow chart of the derive subroutine;

FIG. 13 is a flow chart of the calculate subroutine; and

FIG. 14 is a flow chart of the learn mode subroutine.

Figure 1:
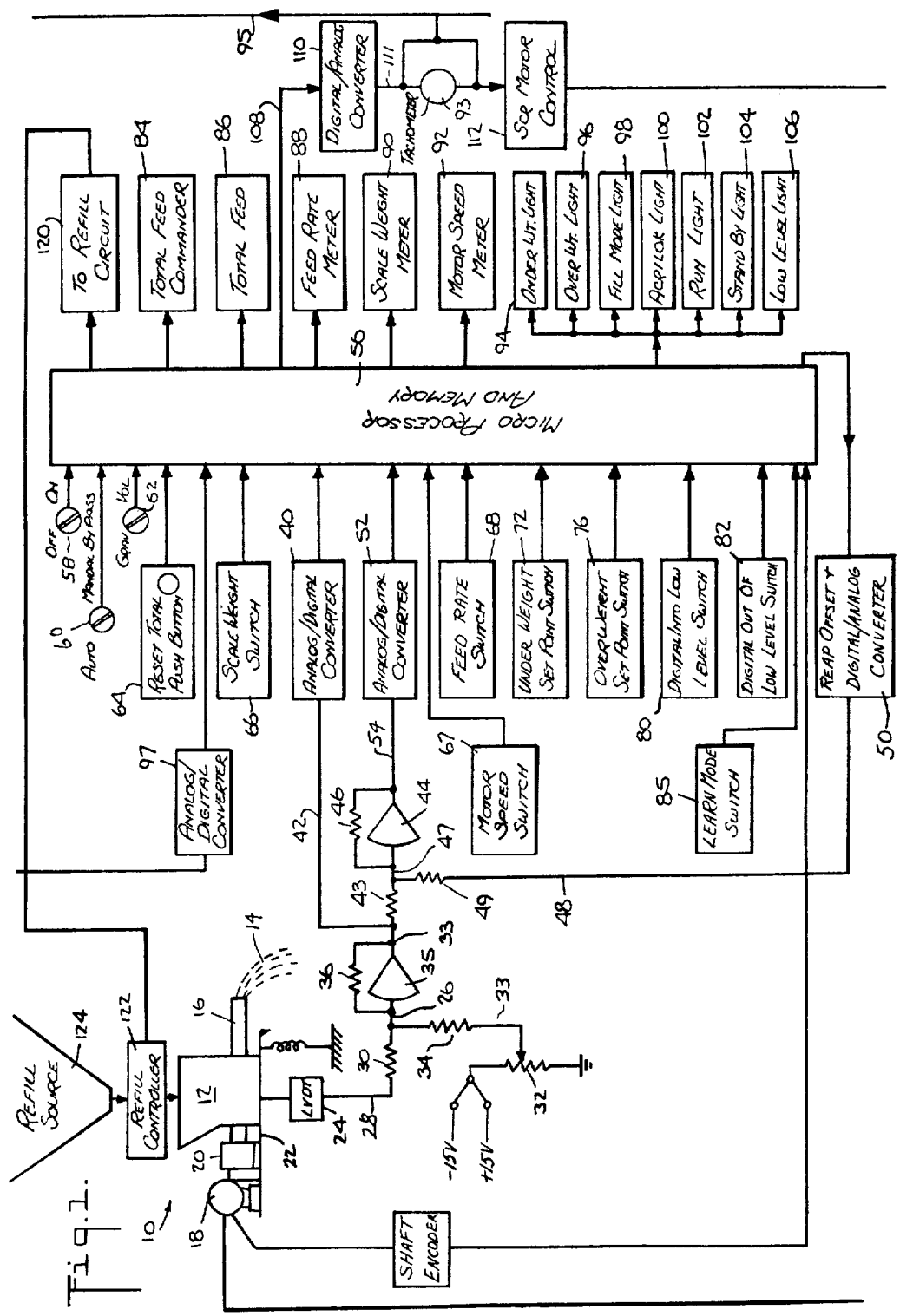
FIG. 1 is a block diagram of the weigh feeder system constructed in accordance with the concepts of the present invention.

The weigh feeder system of this invention, as shown diagramatically in FIG. 1, includes a feeder assembly indicated generally at 10, which comprises a container 12 with a discharge device connected thereto for feeding the substance 14 out of the container and through a discharge conduit 16. As illustrated, a DC motor 18, connected to a gear-reduction device 20 is provided for driving the discharge device. The feeder assembly may comprise an auger mechanism as disclosed in detail in U.S. Pat. No. 3,186,602 issued June 1, 1965. The entire feeding assembly, including the container, the discharge device, the motor, and the gear-reduction device is mounted on a scale 22, which may comprise a structure as described in detail in U.S. Pat. No. 3,494,507, issued Feb. 10, 1970.

Figure 2:
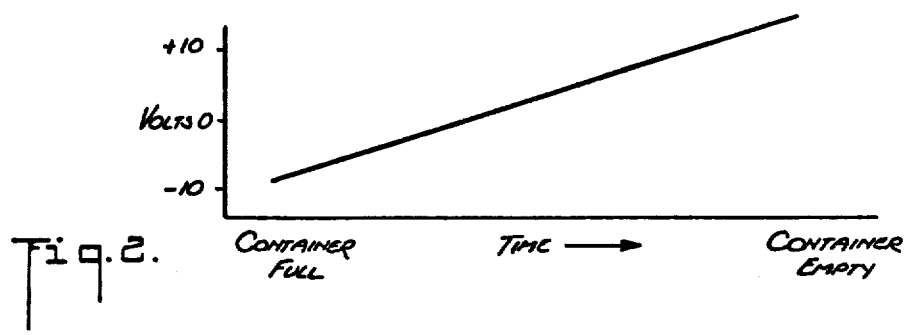
FIG. 2 is a graphic representation of the output voltage with respect to time of one of the amplifier circuits of the present invention.

In accordance with the invention there is provided a detecting device, as for example, a linear variable differential transformer (LVDT) 24, coupled to the scale for providing an electrical signal having an amplitude which is proportional to the weight of the container and its contents. That is, as the contents of the container 12 are discharged, a relative movement occurs between the windings and the core of the LVDT, thereby causing a varying output voltage proportional to the varying weight of the container and its contents. Thus, as the substance is discharged from the container, the LVDT provides an electrical signal which varies in response to such discharge, which may, for example, be a DC voltage with a range of the order of from Δ3 volts to Δ6 volts when the material in the container drops from its upper level to its lower level. The signal from the LVDT is applied to a summing junction 26 by a conductor 28, through a resistor 30. Also, applied to the summing junction 26 is an offset potentiometer means 32, by a conductor 33 through a resistor 34, to render the signal from the LVDT symmetrical with respect to zero as measured at 38. The output from the summing junction 26 is applied to an amplifier 35, having a gain potentiometer 36, to produce an output signal at 38, which ranges, for example, from −10 volts when the container 12 is full to a +10 volts when the container is empty, as shown by the curve in FIG. 2. The output signal from the amplifier 35 is applied to a conventional analog-digital converter (ADC) 40, by way of a conductor 42, wherein the offset amplified LVDT signal is measured and digitalized and outputted as digital words, corresponding to the total scale weight, i.e. the quantity of material contained in the container 12. Any suitable type of ADC may be employed such as a 12 bit, Model No. 124-10 XW 3, as manufactured by Analog Devices, Inc.

Figure 3:
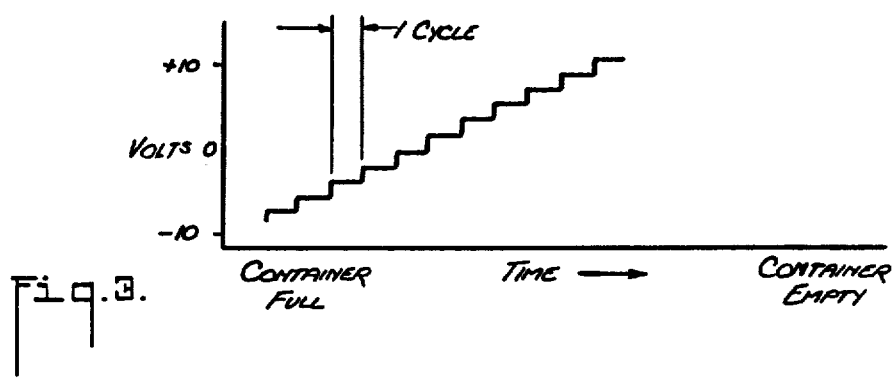
FIG. 3 is a graphic representation of the output of a controlled ramp offset circuit of the present invention.
Figure 4:
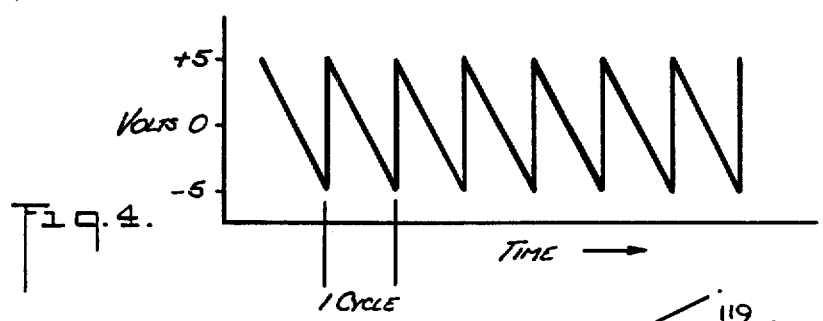
FIG. 4 is a graphic representation of the output of a second amplifier circuit.

In addition, the output signal from the amplifier 35 is applied through a resistor 43 to a second amplifier 44, having a feed back resistor 46, thereby to provide a gain of the order of about a 700 multiple. Applicants have found that a gain of this order is necessary in order to make the desired calculations later in the system, but with such a gain, the voltage would normally be too high, as a practical matter, for computational use, and therefore, a controlled ramp offset signal is also applied to a summing junction 47 by a conductor 48 through a resistor 49. This offset signal is provided by a ramp offset digital-analog converter (DAC) 50, which receives controlled digital words or binary bits and converts them to a step-shaped signal, having a frequency corresponding to one time cycle of operation of the process system, as shown by the curve in FIG. 3. This ramp offset functions in cooperation with the amplifier 44 so that a controlled quantity is subtracted from the input to the amplifier, whereby during one time cycle of operation the output from the amplifier 44 gradually decreases from about +5 volts to about −5 volts. The ramp offset 50 is a fast acting electronic servo (typically 50 microseconds), and is controlled so that between time cycles of operation its output is adjusted one step as shown in FIG. 3. Thus, at the beginning of the next succeeding time cycle, the output from the amplifier 44 is again about +5 volts as shown in FIG. 4. Any suitable type of ramp offset DAC may be employed, such as a 14 bit Model ZD354M1, having a resolution of 1 part in 10,000, as manufactured by Zeltex, Inc., for example. The amplifiers 35 and 44 may be of any suitable type such as Model OPO5EJ, as manufactured by Precision Monolithics, Inc., for example.

The output from the amplifier 44 is applied to a conventional 12 bit analog-digital converter (ADC) 52 by a conductor 54, wherein the output signal from the amplifier is measured and digitalized. The output from the ADC is in the form of digital words corresponding to the scale weight, but greatly amplified.

A binary number system is employed as the code for information handling because of certain advantages hereinafter brought out. Thus, as seen in FIG. 1, the weigh feeder system is provided with a digital computer 56, which includes processing, memory and control systems. Any suitable digital computer may be employed such as a micro processor Model IMP16C/300 and memory Model IMP16P/004P, as manufactured by National Semiconductor Corp., for example.

Still referring to FIG. 1, a plurality of inputs are applied to the processor to control the same. A conventional off-on switch 58 serves to control the main power supply to the processor. A switch 60 is provided whereby the refill sequence may be automatically actuated (switch in "auto") when product level reaches low level, or at any product level (switch in "manual") or, the refill sequence may be bypassed (when switch is in "bypass"). The refill sequence is a procedure wherein the motor speed will not lockout for refill thereby actuating the refill controller until the computer first senses that the scale is undisturbed by foreign influences and secondly, senses that the feed rate agrees with the set point. Input switch 62 serves to convert the system between gravimetric control and volumetric control, as desired. This will be explained more fully hereinafter. A reset total push button switch 64 serves to reset the processor for an entirely new batch of data. Also, there is provided a scale weight switch 66, that inputs into the processor the scale weight, S, which is determined by the size or model of the feeder assembly 10 being employed in the particular installation. This factor is set once and is not adjusted unless a new model or size of feeder assembly is installed.

A motor speed input switch 67 is provided, which is set by the operators at a preselected percent in the range between 0% and 100%, to input into the processor the desired operating speed of the motor when operating volumetrically.

Input switch 68 is actuated by the operator to input the desired feed rate R (LBS./HR) into the processor. This is a 16 bit digital word, stored in memory, that represents the desired slope of the feed line or curve 70, FIG. 5. Input switch 72 is also actuated by the operator to input the underweight set point into the processor memory. It represents the selected minimum limit of the feed rate range, as is indicated by the dotted line 74 in FIG. 5. This limit is expressed as a percentage of from 0 to 9.99% below the desired feed rate R. Input switch 76 inputs the overweight set point into memory. It represents the selected maximum limit of the feed range, as is indicated by the dotted line 78 in FIG. 5. This limit also is expressed as a percentage of from 0 to 9.99% above the desired feed rate R.

Still referring to FIG. 1, digital switch 80 is an operator activated switch to input into the memory, the desired minimum or low level of the material in the container 12. The range of this switch is from 0 to 99.9%. Thus, for example, if the operator desires the system to shift into its refill mode when the container 12 is down to 5% of its capacity, he sets the low level switch 80 at 05.0%. Digital input switch 82 is an out of low level switch with a range of from 0 to 99.9% so that the operator can input into memory the desired level for the system to shift out of its refill mode to its normal operative mode. Thus, for example, the operator could set this switch for 90.0%, whereby when the container 12 reaches 90% of its capacity, the system would shift out of its refill mode to its normal operative mode.

Figure 6:
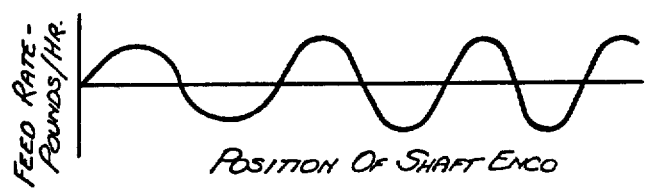
FIG. 6 is a graphic representation of the positional relationship of the shaft encoder with respect to the material being fed.
Figure 7:
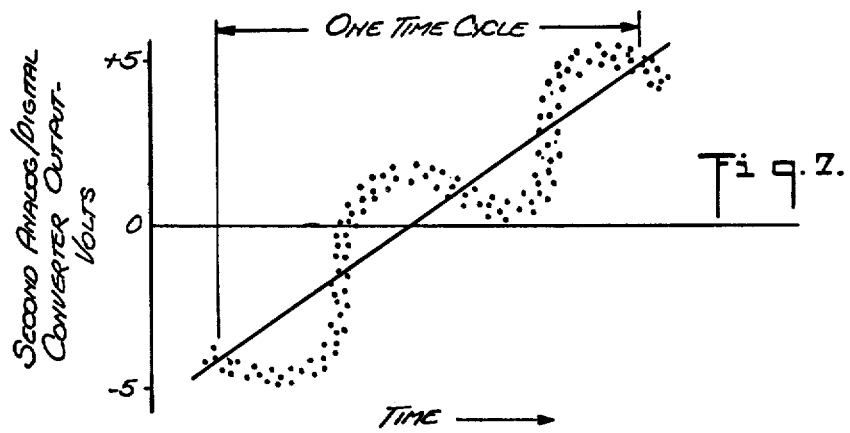
FIG. 7 is a graphic representation of the output of the second analog-digital converter with respect to time, before correction for induced system noises.
Figure 8:
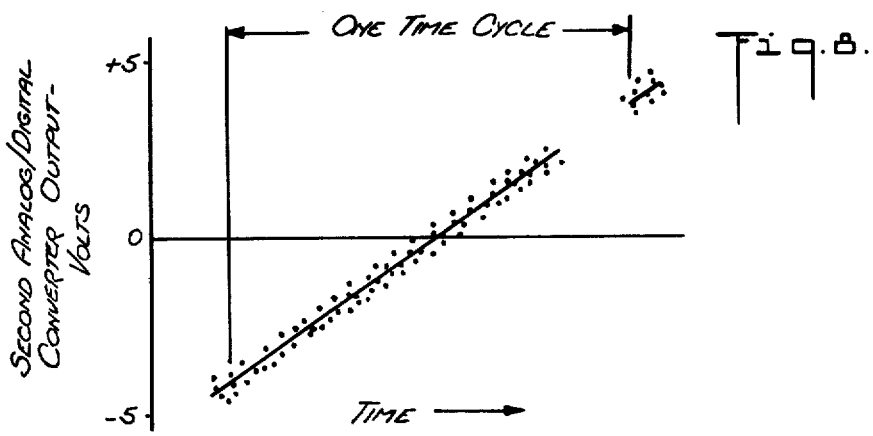
FIG. 8 is a graphic representation of the output of the second analog-digital converter with respect to time, after correction for induced system noises.
Figure 12A:
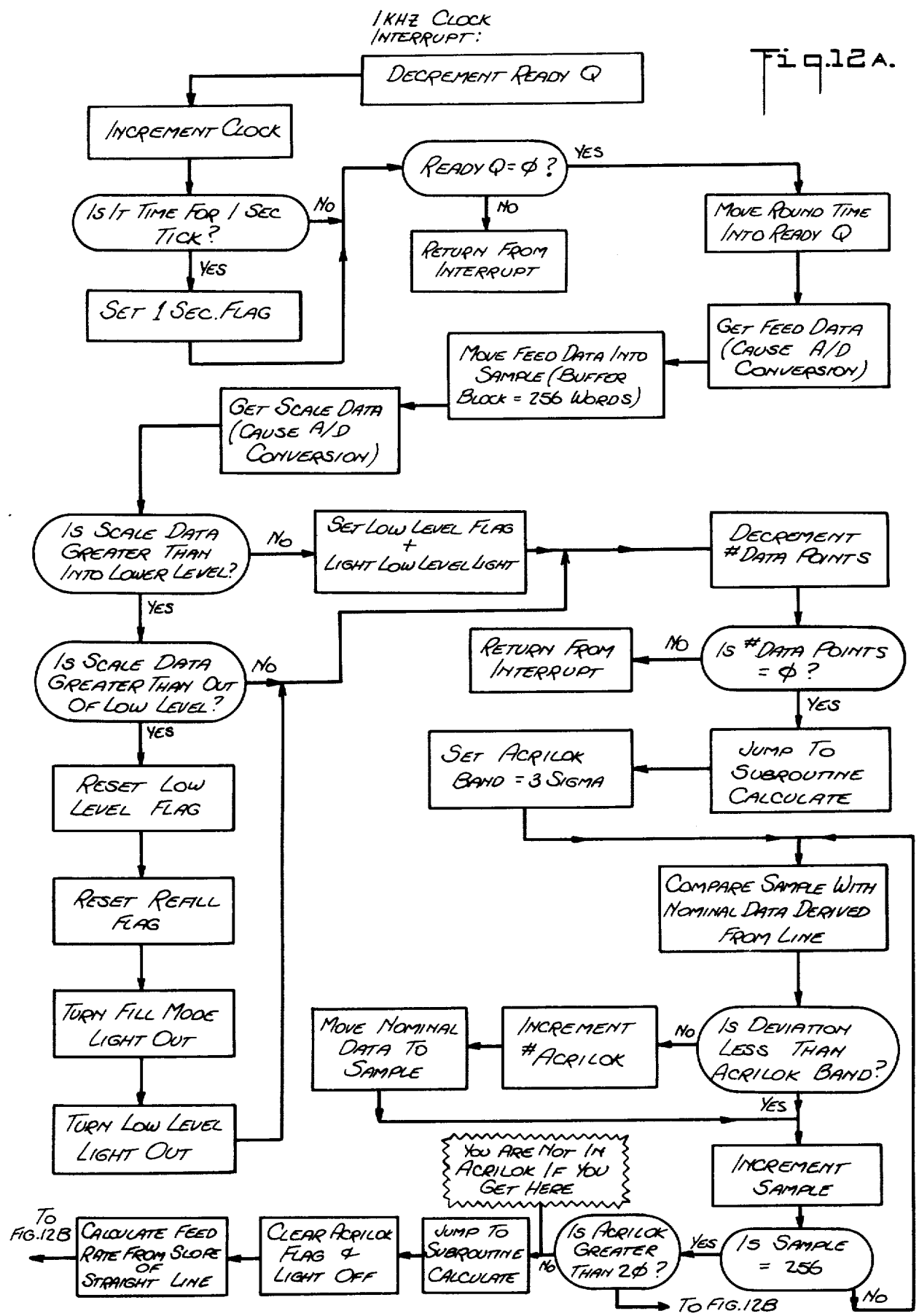
FIGS. 12A, 12B and 12C is a flow chart of the main routine of the computer.
Figure 12B:
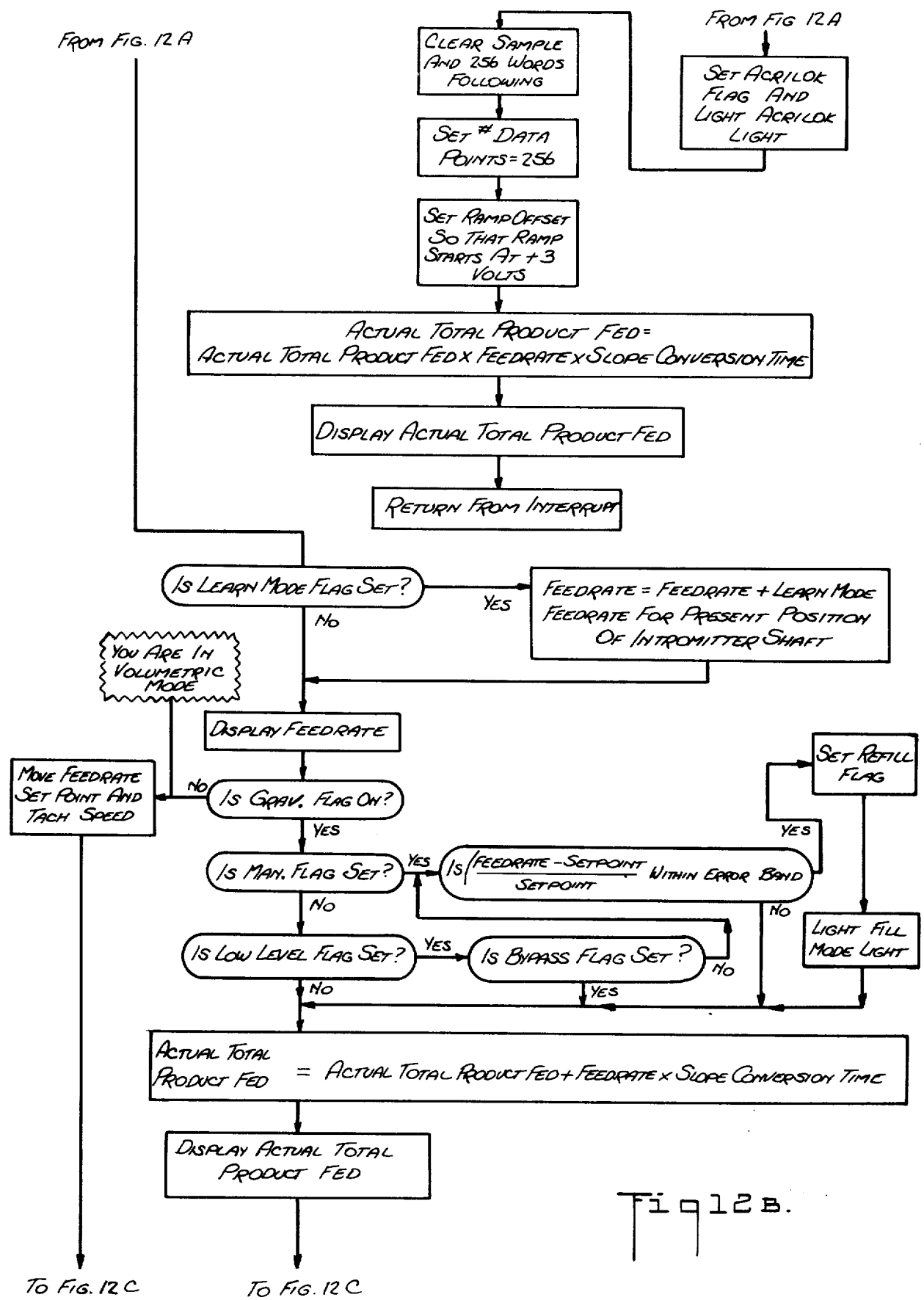
Figure 12C:
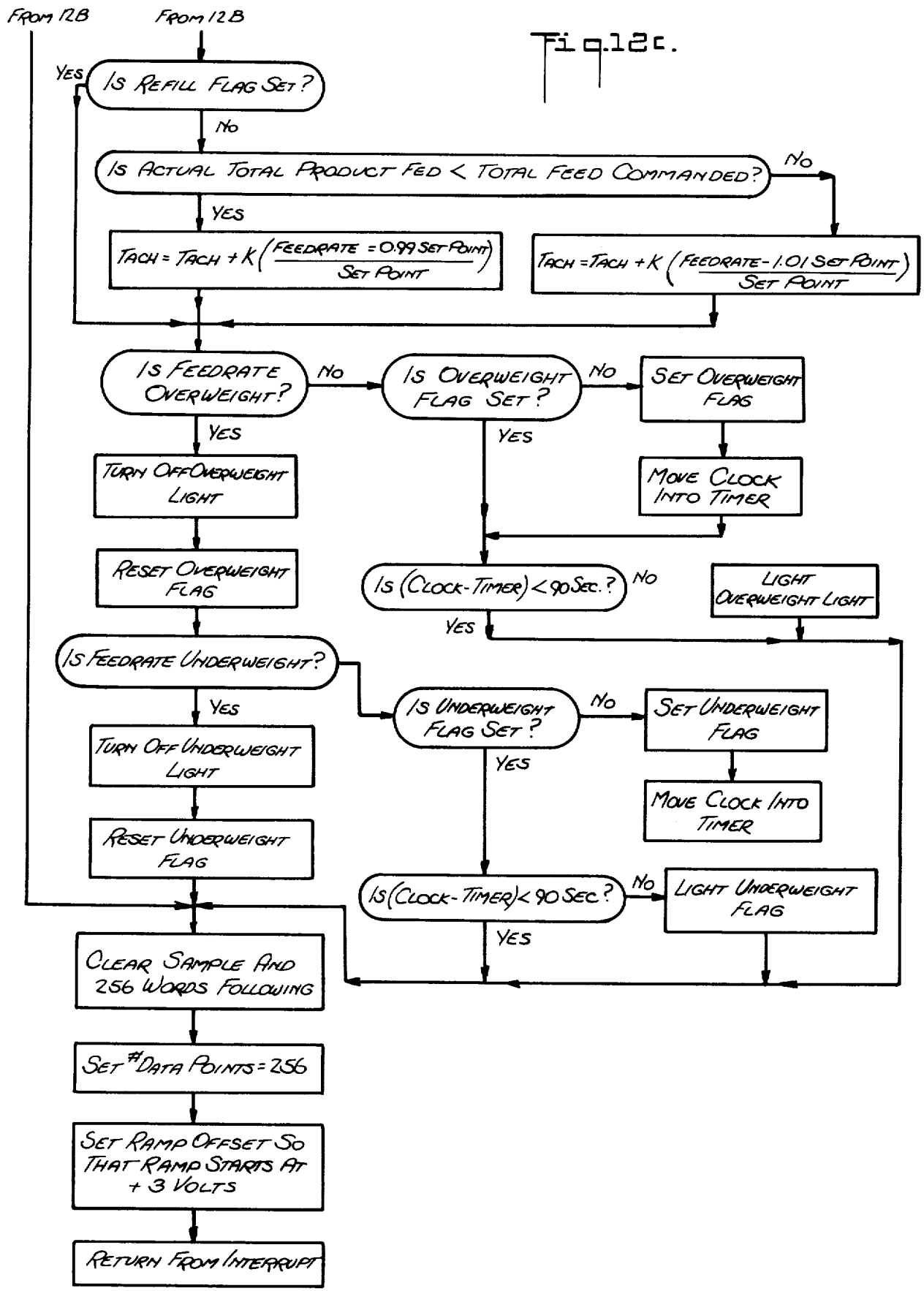

In addition, the processor also receives a signal from a shaft encoder 83. This allows a correlation to be made between system noises induced by the movement of the machinery mounted on the scale or movement of the product in the storage hopper. This correlation may then be used as a correction factor, subtracting out noise components due to moving machinery on the scale such as for example, the motor, gear box, augers, as well as movement of the material in the container. The processor 56 is provided with a learn mode input switch 85, which is shiftable between normal operation and learn mode operation. When a new material is going to be processed by the system or when the system is first installed, the system is set in operation, but instead of discharging the substance 14 out of the system, it is collected in a small container, not shown, and retained on the scale 22 so that there is no net loss of weight from the scale. The switch 85 is shifted to its learn mode position. The motor 18 is run throughout its speed range and the shaft encoder 83 picks up the noise corresponding to the rotational position of the drive shaft and sends out digital signals to the processor, which are stored in memory. After this information has been stored in memory, the small container is removed from the scale and the switch 85 is shifted to its normal operation. FIG. 6 illustrates the positional relationship of the shaft encoder 83 with respect to the material being fed. FIG. 7 illustrates the output of the ADC 52 with respect to time, before it is corrected for the induced system noises. Processor 56, as another operation thereof, subtracts the stored data from the data received from the ADC 52 to present a relatively straight line of this information for processing. FIG. 8 illustrates the corrected output from the ADC 52 for one time cycle of operation. Any suitable type of shaft encoder may be employed such as a Series 2500, Optical Encoder, as manufactured by Renco Corporation.

The microprocessor 56 has, as an output, a display device 84 which indicates the total feed commanded. This device indicates the total feed asked for by the operators over a relatively long period of time. Thus, the processor, as one operation thereof, receives the selected feed rate R from the input switch 68 and integrates it with respect to the elapsed time and continuously displays the total feed commanded, in pounds. As another output there is provided a display device 86 which indicates the actual total feed discharge from the feeder assembly 10. Thus, the processor, as one operation thereof, receives a signal from the ADC 40 corresponding to the total scale weight, which indicates the guantity of material remaining in the container. This signal represents the amount of weight of material in the feeder 12. Any change in this signal, except during refill, represents the amount of material fed. These changes are totalled by the processor to give the actual total feed, in pounds. During refill the amount of material fed is computed by the processor from the reading of the feed rate meter and the time it takes to refill. When refill is completed the signal from the ADC 40 is again used to compute the total amount of material fed. The operators can compare the actual total feed, as displayed at 86, with the total feed commanded, as displayed at 84, to determine how the system is functioning and, if necessary, take corrective action.

A feed rate display device, such as a four digit meter, 88, for example, shows the actual feed rate in pounds per hour of the feeder assembly. Thus, the processor, as another operation thereof, receives the amplified scale weight signal from the ADC 52 and corrects this signal as pointed out hereinbefore, and then differentiates the signal with respect to time to produce a signal indicative of the present rate of feed. This can be visually compared to the desired feed rate as set by the input switch 68 to determine possible malfunctions in the system.

A scale weight display device, such as a three digit meter 90, for example, is provided to indicate the actual percentage of product remaining in the container 12 on the scale 22. Thus, the processor, as still another operation thereof, receives a signal from the ADC 40 corresponding to the weight on the scale 22 and computes the actual percentage of material remaining in the container 12. Next, there is provided, as another output of the processor 56, a three digit motor speed meter 92 which indicates the actual speed of the motor 18. That is, the processor receives a signal from a tachometer 93, indicating the speed of the motor 18, by a conductor 95 through a conventional analog-digital converter 97, and outputs a motor speed on meter 92. While this speed is usually relatively constant, it may vary to some extent over a long period of time. It is advantageous for the operator to know, as any sudden variations may indicate a blockage of material in the system.

In addition, there are provided operational and warning indicators, such as lights, buzzers, or the like, for example, for purposes of keeping the operators informed. An underweight light 94 indicates when the actual feed rate, as indicated by the meter 88, falls below the underweight set point 72, and an overweight light 96 indicates when the actual feed rate exceeds the overweight set point 76. That is, when the actual feed rate falls below the line 74, FIG. 5, which is set by the underweight set point switch 72, the underweight light 94 is actuated, and when the actual feed rate is above the line 78, FIG. 5, which is set by the overweight set point switch 76, the overweight light 96 is actuated. Preferably, there is a preselected time delay period of from about 0 to about 3 minutes delay after the feed rate meter 88 indicates an overweight or an underweight condition before the warning lights are actuated. Light 98 shows when the system is in its refill mode, i.e. when the container 12 is being refilled. The light 100 indicates that the system is in its ACRILOK mode. This mode of operation will be explained more fully hereinafter. Run light 102 indicates that the system is in operation and standby light 104 indicates that the system power has been applied, but all machinery is stopped. The light 106 indicates that the bin 12 is in its low level condition.

A control output 108 from the processor 56 is applied to a digital-analog converter (DAC) 110. Any suitable type of DAC may be employed, such as a 10 bit Model AD7520L, as manufactured by Analog Devices, Inc., for example. In the DAC, the digital pulses are converted to an analog signal, which is applied to the tachometer 93 and an SCR motor control 112. Any suitable type of motor control may be employed such as Acrison, Inc.'s Model ACR100BTG, for example. This controller produces an output which is applied to the motor 18 to control the speed thereof, and thereby control the discharge rate of the material from the feeder assembly 10.

In operation, the operator must determine whether he wishes to operate in the volumetric mode or the gravimetric mode. If the volumetric mode is selected, then the operator sets the motor speed switch 67 to the desired motor speed. In this mode of operation, the output of the processor is a digital word conveyed by conductor 108 to the DAC 110. The DAC causes a voltage from 0 to 6 volts to appear on conductor 111 and the SCR motor control adjusts the speed of the DC motor 18 unitl the output of the tachometer 93 exactly equals the voltage on the conductor 111. While this mode of operation is desirable at certain times, it does not provide as high a degree of accuracy as the gravimetric mode and, consequently, the gravimetric mode is predominantly employed.

Figure 5:
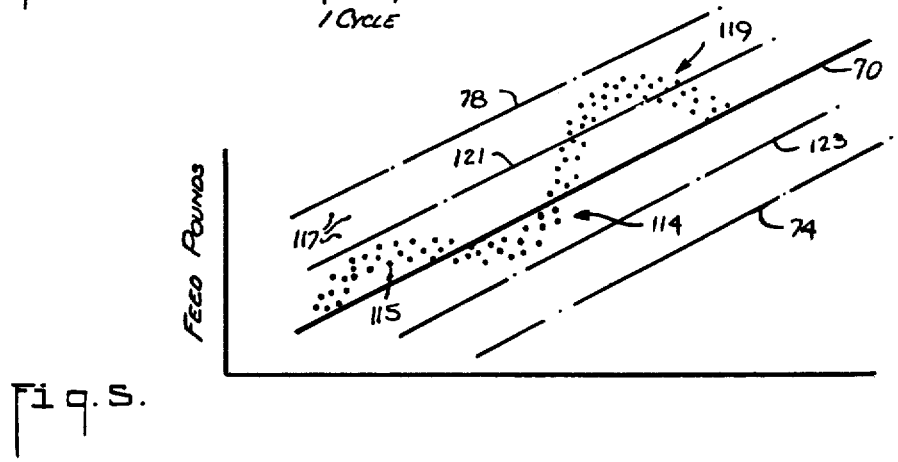
FIG. 5 is a graphical representation of the actual measured feed curve as compared to the desired feed curve.

In operation, when the operator sets the switch 62 to the gravimetric mode of operation, the operator then sets the feed rate switch 68 to the desired feed rate R (LBS./HR), which, as discussed hereinbefore, determines the slope of the feed curve or line 70, FIG. 5. The processor then computes the conversion time which may be, for example, $T = S/R$ (2.5) in seconds, where S is the scale weight as set by switch 66. Next, the ramp offset 50 is energized which, as pointed out hereinbefore, limits the range of the output 54 of the amplifier 44 to between +5 volts and −5 volts. Initially, it sets said output at about +5 volts. Next, the processor starts the conversion time. The conversion time T, may, for example, be about 250 milliseconds. A plurality of samples are taken based on the input from the ADC 52, which may for example, be about 100. The conversion time, T, or time to complete one cycle of operation is selected to be within the range of from about one-fourth seconds minimum to a maximum of from about 100 to 200 seconds. During this cycle, the output from the amplifier 44 moves from about +5 volts to about −5 volts. Each sample is stored in memory. The samples, generally illustrated in FIG. 5 by dots, form the actual feed curve 114. One of the most important operations of the processor is to compute a regression analysis on these samples with respect to time T, and thence compute the RMS error on T.

FIG. 5 illustrates an upper 3 RMS error line at 121 and a lower 3 RMS error line at 123. If less than 20, for example, sample data points exceed 3RMS error in either direction, as indicated at 115 in FIG. 5, regression on T is recomputed with the data points exceeding 3 RMS, as indicated at 117, excluded. Thence, the computed slope of the actual feed curve is compared with the slope of the desired or set point feed line, and a corresponding correction command is outputted at 108 to adjust the motor control 112, thereby to adjust the actual rate of discharge of the material from the feeder assembly 10. This time cycle of operation is continuously repeated to continuously adjust the motor control 112.

If more than 20, for examle, sample data points exceed 3 RMS error in either direction, as indicated at 119 in FIG. 5, the system is changed into its ACRILOK mode. That is, the ACRILOK light 100 is energized and the output command 108 to the DAC 110 and motor control 112 is not updated, but continues in its present state. That is, the processor continues to receive sample signals from the ADC 52 and compute the regression analysis thereof, but no correction command is outputted at 108. The feed rate meter 88 is also locked at the last control data point. The feed system remains in a locked condition unitl in a subsequent time cycle of operation less than 20 data points exceed 3 RMS error, and then the system is returned to its normal operating mode and the correction command is again outputted at 108.

As still another operation of the processor, the total feed commanded, as indicated at 84, is compared to the actual total feed, as indicated at 86, periodically, such as every 5 or 10 minutes, for example. If there is a deviation exceeding predetermined limits, the processor modifies the aforementioned command output at 108 to gradually correct the actual feed to the total feed. This is programmed to take from about 5 minutes to about 10 minutes, thereby to avoid sharp fluctuations in the feed rate command, but nevertheless, obtain as close as possible the total feed selected over a long period of time.

A further operation of the processor, is to determine when the scale weight, as indicated by the meter 90, drops to a predetermined low level, as set by the low level switch 80, and then search for an "on rate" condition. That is, the output signal outputted at 88 is monitored until the difference between it and the feed rate switch 68 is less than a predetermined error limit. Thence, the system is changed into its refill mode wherein the output command 108 and feed rate meter 88 are not updated, but are retained in its present state, similar to its operation as described hereinbefore in connection with the ACRILOK mode. At the same time, a command is outputted to a refill circuit 120, which sends a signal to a refill controller 122 that controls the flow of material from a refill source 124 to the container 12. The controller 122 could be an AC motor when handling dry particulate material or could be a valve when handling liquids.

The system remains in the refill mode until the processor detects that the container 12 is refilled, as indicated by the scale weight meter 90, and as selected by the out of low level switch 82. At this time, the processor outputs a signal to the refill circuit 120 which, in turn, directs the refill controller 122 to discontinue refilling the container 12. The processor then returns the system to its normal operational mode.

FIGS. 9 to 14 are various flow charts of the computer 56. Thus, FIG. 9 is a flow chart showing the wait subroutine, and FIG. 10 is a flow chart of the second interrupt subroutine, which is a display type subroutine. FIG. 11 is a flow chart of the derive subroutine wherein the normal conversion time is calculated. FIGS. 12A, 12B and 12C combine to form a flow chart of the main routine of the computer 56. FIGS. 13 and 14 are flow charts of the calculate and learn mode subroutines, respectively.

| GRAV/VOL. | = GRAV. |
|---|---|
| ON/OFF | = OFF |
| AUTO/MAN./BY-PASS | = AUTO |
| SCALE WEIGHT | = 1000. lbs |
| FEED RATE SET POINT | = 200 LBS./HR |
| INTO LOW LEVEL | = 20% |
| OUT OF LOW LEVEL | = 80% |
| MOTOR SPEED | = 50% |
| ASSUME MAX. FEED RATE OF MACHINE | = 2000 LBS./HR |
| REAL TIME CLOCK RATE | = 1 KHZ (Clock causes interrupt) |

Flags set by hardware:

Grav. Flag
Run Flag
Learn Flag
By-Pass Flag
Man. Flag
Reset total Flag

Number of Samples per slope calculation = 256 The time between samples is chosen so that you have covered about 60% of the range of the ramp offset 50 for each slope calculation. The ramp offset is reset for each new slope calculation. Thus, the lower the set point the longer it takes to calculate the slope.

The following is a program with descriptive comments for carrying out the basic operations of the computer 56:

```
*B
*L T/2
*T T/2
END
```

```
                177554          OUT = 177554
                177552          DATA = 177552
                177554          OFFSET = 177554
                177550          SET = 177550
                177550          LKS = 177550
                040200          ONEF = 040200
                040400          TWOF = 040400
                040700          SIXF = 040700
                000004          WAITR = 4
                000011          READ = 11                    DEFINITIONS OF
                000012          WRITE = 12                   CONSTANTS, ADDRESSES
                000000          R0=%0                        AND REGISTERS.
                000001          R1 = %1
                000002          R2 = %2
                000003          R3 = %3
                000004          R4 = %4
                000005          R5 = %5
                000006          R6 = %6
                000006          SP = %6
                000007          PC = %7
                057452          $ADR=57452
                060206          $CMR=60206
                063500          $DVR=63500
                061664          $GCO=61664
                064146          $IR=64146                    LINKS TO FLOATING POINT
                064232          $MLR=64232                   MATH PACKAGE (FPMP-WRITTEN
                064412          $MLR=64412                   BY D.E.C.)
                064772          $NGR=64772
                065146          $POLSH=65146
                060264          $RCI=60264
                065024          $RI=65024
                057446          $SBR=57446

000174          .=174

000174          050722          .WORD INT                    SET UP 1KHZ. CLOCK INTERRUPT
000176          00340           .WORD 000340                 VECTOR

050000          .=50000

050000          010767          START: MOV PC, STKST
                003642
050004          016706          MOV STKST, SP                ; STACK POINTER IS
                003636                                       NOW POINTING
050010          005746          TST (SP)—                    TO STKST 050012          013700          MOV at #177552, R0
                177552

050016          052767          BIS #2, SET                  ;INITIALIZE
                000002                                       OFFSET
                127524                                       VOLTAGE TO
050024          012767          MOV #177777,OFFSET           ZERO (IN
                                                             COMPLEMENT
                                                             FORM
                177777
                127522                                       ;INITIALIZE
050032          005067          CLR SET                      CONTROL
```

-continued

| | | | | |
|---|---|---|---|---|
| 050036 | 127512<br>RQ at GE<br>012767 | 001 | MOV #177777,OFFSET | VOLTAGE TO ZERO(IN COMPLEMENT FORM) |
| | 177777 | | | |
| 050044<br>050046<br>050050 | 127510<br>000004<br>000000<br>002 | | IOT<br>.WORD 0<br>.BYTE 2,0 | INITIALIZE TELETYPE THROUGH IOX (IOX IS WRITTEN BY D.E.C.) |
| 050051<br>050052<br>050054<br>050056 | 000<br>00004<br>050060<br>003 | | IOT<br>.WORD ASK<br>.BYTE 3,0 | SETS UP CONTROL P RETURN ADDRESS |
| 050057<br>050060 | 000<br>012701 | ASK: | MOV #TABLE1, R1; | GET ADDRESS OF TABLE OF QUESTIONS |
| 050064 | 050400<br>012767 | | MOV #9., LOOP; | SET UP LOOP FOR NINE QUESTIONS |
| 050072 | 000011<br>003552<br>012700 | | MOV #MTABLE R0; | GET ADDRESS OF TABLE CONTAINING POINTERS TO THE 9 QUESTIONS |
| 050076 | 050356<br>012067<br>000002 | MORE: | MOV (R0)+,WBUFFER | |
| 050102<br>050104<br>050106 | 000004<br>000000<br>012 | WBUFFER: | IOT<br>.WORD 0<br>.BYTE WRITE, 1 | QUESTION |
| 050107 | 001 | | | |
| 050110<br>050112<br>050114 | 000004<br>050250<br>011 | | IOT<br>.WORD BUFFER<br>.BYTE READ,0 | GET A REPLY |
| 050115 | 000 | | | |
| 050116<br>050120<br>050122 | 00004<br>050116<br>004 | WAITT: | IOT<br>.WORD WAITT<br>.BYTE WAITR,0 | WAIT UNTIL REPLY IS GIVEN BY OPERATOR AT TTY. |
| 050123<br>050124 | 000<br>012746 | | MOV #BUFFER+6, (SP)−; | PUT ADDRESS OF REPLY ON STACK |
| 050130 | 050256<br>016746 | | MOV BUFFER +4, (SP)−; | PUT LENGTH OF REPLY ON STACK |
| 050134 | 00120<br>162716<br>000002 | | SUB #2, (SP) | |
| 050140 | 005046 | | CLR (SP)− | FREE FORMAT CONVERSION |
| 050142 | 005046 | | CLR (SP)− | |
| 050144 | 004767<br>050114 | | JSR PC, RCP: | CONVERT REPLY TO FLOATING POINT #. |
| 050150<br>050152 | 032621<br>033521 | | MOV (SP)+, (R!)+<br>MOV (SP)+(R1)+ | STORE REPLY IN TABLE 1. |
| 050154 | 005367<br>003464 | | DEC LOOP | |
| 050160 | 001346 | | BNE MORE | |
| 050162 | 005046 | | CLR (SP)− | |

-continued

| | | | |
|---|---|---|---|
| 050164 | 012746 | MOV #042722, (SP)— | PUT FLTING PT. 1680 ON THE STACK |
| | 042722 | | |
| | RQ at GE 002 | | |
| 050170 | 012701 | MOV #TABLE 1,14, R1 | |
| | 050414 | | |
| 050174 | 014146 | MOV (R1)—, (SP)— | |
| 050176 | 014146 | MOV (R1)—, (SP)— | CALCULATE #SAMPLES/SEC. |
| 050200 | 014146 | MOV (R1)—, (SP)— | |
| 050202 | 014146 | MOV (R1)—, (SP)— | |
| 050204 | 004467 | JSR R4, $POLSH | |
| | 014736 | | |
| 050210 | 063500 | $DVR | |
| 050212 | 050214 | .WORD .+2 | |
| 050214 | 011667 | MOV (SP), HOLD8 | STORE #SAMPLES/ SEC |
| | 003450 | | |
| 050220 | 016667 | MOV 2(SP), HOLD9 | |
| | 000002 | | |
| | 003444 | | |
| 050226 | 004467 | JSR R4, $POLSH | DIVIDE SAMPLES/ SEC BY 1680 TO GIVE THE # OF INTERRUPTS PER SAMPLE |
| | 014714 | | |
| 050232 | 063500 | $DVR | |
| 050234 | 065024 | $R1 | |
| 050236 | 050240 | .WORD .+2 | |
| 050240 | 012667 | MOV (SP)+, INTSAM; | STORE RESULT. |
| | 003430 | | |
| 050244 | 000167 | JMP INIT; | GO TO THE INITIALIZATION SECTION |
| | 002126 | | |
| 050250 | 000100 | BUFFER: 100 | |
| 050252 | 000000 | 0 | BUFFER FOR REPLYS TO QUESTIONS |
| 050254 | 000000 | 0 | |
| | 050356 | .=.+100 | |
| 050356 | 050450 | MTABLE: TABLE | |
| 050360 | 050472 | TABLE2 | |
| 050362 | 050506 | TABLE3 | |
| 050364 | 050522 | TABLE4 | POINTERS TO THE QUESTIONS |
| 050366 | 050544 | TABLE5 | |
| 050370 | 050570 | TABLE6 | |
| 050372 | 050604 | TABLE7 | |
| 050374 | 050630 | TABLE8 | |
| 050376 | 050662 | TABLE9 | |
| | 050450 | TABLE1: .=.+50 | |
| 050450 | 000014 | TABLE: TABLE2-TABLE-6 | |
| 050452 | 000000 | 0 | |
| 050454 | 000014 | TABLE2-TABLE-6 | THE QUESTIONS |
| 050456 | 015 | .BYTE 15,12 | |
| 050457 | 012 | | |
| 050460 | 106 | .ASCII 'FEED V/S='; | VOLTS/SECOND FEED RATE |
| 050461 | 105 | | |
| 050462 | 105 | | |
| 050463 | 104 | | |
| 050464 | 040 | | |
| 050465 | 126 | | |
| 050466 | 057 | | |
| | RQ at GE 003 | | |
| 050467 | 123 | | |
| 050470 | 075 | | |
| | 050472 | .EVEN | |
| 050472 | 000006 | TABLE2: TABLE3-TABLE2-6 | |
| 050474 | 000000 | 0 | |
| 050476 | 000006 | TABLE3-TABLE2-6 | |
| 050500 | 124 | .ASCII 'TIME='; | SMALL SMAPLE TIME IN SECONDS |
| 050501 | 111 | | |
| 050502 | 115 | | |
| 050503 | 105 | | |
| 050504 | 075 | | |
| | 050506 | .EVEN | |

|        |        |        |                          |                      |
|--------|--------|--------|--------------------------|----------------------|
| 050506 | 000006 |        | TABLE3: TABLE4-TABLE3-6  |                      |
| 050510 | 000000 |        | 0                        |                      |
| 050512 | 000006 |        | TABLE4-TABLE3-6          |                      |
| 050514 | 043    |        | .ASCII '#SAM=';          | #SAMPLES PER         |
|        |        |        |                          | SMALL SAMPLE TIME    |
| 050515 | 123    |        |                          |                      |
| 050516 | 101    |        |                          |                      |
| 050517 | 115    |        |                          |                      |
| 050520 | 075    |        |                          |                      |
|        | 050522 | .EVEN  |                          |                      |
| 050522 | 000014 |        | TABLE4: TABLE5-TABLE4-6  |                      |
| 050524 | 000000 |        | 0                        |                      |
| 050526 | 000014 |        | TABLE5-TABLE4-6          |                      |
| 050530 | 105    |        | .ASCII 'ERR BND V/S=';   | SMALL                |
|        |        |        |                          | SAMPLE ERROR         |
|        |        |        |                          | BAND IN              |
|        |        |        |                          | VOLT/SECOND          |
| 050531 | 122    |        |                          |                      |
| 050532 | 122    |        |                          |                      |
| 050533 | 040    |        |                          |                      |
| 050534 | 102    |        |                          |                      |
| 050535 | 116    |        |                          |                      |
| 050536 | 104    |        |                          |                      |
| 050537 | 040    |        |                          |                      |
| 050540 | 126    |        |                          |                      |
| 050541 | 057    |        |                          |                      |
| 050542 | 123    |        |                          |                      |
| 050543 | 075    |        |                          |                      |
|        | 050544 | .EVEN  |                          |                      |
| 050544 | 000016 |        | TABLE5: TABLE6-TABLE5-6  |                      |
| 050546 | 000000 |        | 0                        |                      |
| 050550 | 000016 |        | TABLE6-TABLE5-6          |                      |
| 050552 | 043    |        | .ASCII '#SM SAM/LARGE='  | ;#OF SMALL           |
|        |        |        |                          | SAMPLES              |
|        |        |        |                          | PER LARGE            |
|        |        |        |                          | SAMPLE               |
|        |        |        |                          | TIME.                |
| 050553 | 123    |        |                          |                      |
| 050554 | 115    |        |                          |                      |
| 050555 | 040    |        |                          |                      |
| 050556 | 123    |        |                          |                      |
| 050557 | 101    |        |                          |                      |
| 050560 | 115    |        |                          |                      |
| 050561 | 057    |        |                          |                      |
| 050562 | 114    |        |                          |                      |
| 050563 | 101    |        |                          |                      |
|        | RQ at GE |      | 004                      |                      |
| 050564 | 122    |        |                          |                      |
| 050565 | 107    |        |                          |                      |
| 050566 | 105    |        |                          |                      |
| 050567 | 075    |        |                          |                      |
|        | 050570 | .EVEN  |                          |                      |
| 050570 | 000006 |        | TABLE6 TABLE7-TABLE6-6   |                      |
| 050572 | 000000 |        | 0                        |                      |
| 050574 | 000006 |        | TABLE7-TABLE6-6          |                      |
| 050576 | 105    |        | .ASCII 'ERR K='          | OUTPUT ERROR         |
|        |        |        |                          | CONTANT "K"          |
|        |        |        |                          | THIS IS SYSTEM       |
|        |        |        |                          | GAIN.                |
| 050577 | 122    |        |                          |                      |
| 050600 | 122    |        |                          |                      |
| 050601 | 040    |        |                          |                      |
| 050602 | 113    |        |                          |                      |
| 050603 | 075    |        |                          |                      |
|        | 050604 | .EVEN  |                          |                      |
| 050604 | 000016 |        | TABLE7: TABLE8-TABLE7-6  |                      |
| 050606 | 000000 |        | 0                        |                      |
| 050610 | 000016 |        | TABLE8-TABLE7-6          |                      |
| 050612 | 043    |        | .ASCII '#SM SAM B4 SW='  | ;#OF SMALL           |
|        |        |        |                          | SAMPLES              |
|        |        |        |                          | BEFORE               |
|        |        |        |                          | SWITCHING            |
| 050613 | 123    |        |                          |                      |
| 050614 | 115    |        |                          |                      |
| 050615 | 040    |        |                          |                      |
| 050616 | 123    |        |                          |                      |
| 050617 | 101    |        |                          |                      |
| 050620 | 115    |        |                          |                      |
| 050621 | 040    |        |                          |                      |
| 050622 | 102    |        |                          |                      |
| 050623 | 064    |        |                          |                      |
| 050624 | 040    |        |                          |                      |
| 050625 | 123    |        |                          |                      |
| 050626 | 127    |        |                          |                      |
| 050627 | 075    |        |                          |                      |
|        | 050630 | .EVEN  |                          |                      |
| 050630 | 000024 |        | TABLE8: TABLE9-TABLE8-6  |                      |
| 050632 | 000000 |        | 0                        |                      |
| 050634 | 000024 |        | TABLE9-TABLE8-6          |                      |
| 050636 | 123    |        | .ASCII 'STARTUP ERR BND V/S=' |                 |
| 050637 | 124    |        |                          |                      |
| 050640 | 101    |        |                          |                      |
| 050641 | 122    |        |                          |                      |
| 050642 | 124    |        |                          |                      |

-continued

| | | | |
|---|---|---|---|
| 050643 | 125 | | |
| 050644 | 120 | | |
| 050645 | 040 | | |
| 050646 | 105 | | |
| 050647 | 122 | | |
| 050650 | 122 | | |
| 050651 | 040 | | |
| 050652 | 102 | | |
| 050653 | 116 | | |
| | RQ at GE | 005 | |
| 050654 | 104 | | |
| 050655 | 040 | | |
| 050656 | 126 | | |
| 050657 | 057 | | |
| 050660 | 123 | | |
| 050661 | 075 | | |
| | 050662 | | .EVEN |
| 050662 | 000024 | TABLE: | TABLEZ-TABLE9-6 |
| 050664 | 000000 | | 0 |
| 050666 | 000024 | TABLEZ | TABLEZ-TABLE9-6 |
| 050670 | 043 | | .ASCII '#SM SAM IN STARTUP=" |
| 050671 | 123 | | |
| 050672 | 115 | | |
| 050673 | 040 | | |
| 050674 | 123 | | |
| 050675 | 101 | | |
| 050676 | 115 | | |
| 050677 | 040 | | |
| 050700 | 111 | | |
| 050701 | 116 | | |
| 050702 | 040 | | |
| 050703 | 123 | | |
| 050704 | 124 | | |
| 050705 | 101 | | |
| 050706 | 122 | | |
| 050707 | 124 | | |
| 050710 | 125 | | |
| 050711 | 120 | | |
| 050712 | 075 | | |
| | 050714 | | .EVEN |
| 050714 | 000 | TABLEZ: | .BYTE 0 |
| | 050716 | | .EVEN |
| 050716 | 000167 | LINK: | JMP RESET |
| | 001212 | | |
| 050722 | 005737 | INT: | TST #177552; | START OF INTERRUPT SERVICE. |
| | 117552 | | | |
| 050726 | 005367 | | DEC INTS | IS IT TIME TO SAMPLE? |
| | 002556 | | | |
| 050732 | 001401 | | BEQ SAMPLE | |
| 050734 | 000002 | | RTI | |
| 050736 | 004767 | SAMPLE: | JSR PC, SAVE | |
| | 001366 | | | |
| 050742 | 005267 | | INC SET; | START A/D CONVERSION |
| | 126602 | | | |
| 050746 | 105767 | CK: | TSTB SET | |
| | 126576 | | | |
| 050752 | 100375 | | BPL CK | |
| 050754 | 016700 | | MOV DATA, R0; | GET THE A/D OUTPUT |
| | 126572 | | | |
| 050760 | 005100 | | COM R0 | |
| | RQ at GE | 006 | | |
| 050762 | 016767 | | MOV INTSA, INTS; | RESET # INTERRUPTS/ SAMPLE. |
| | 002524 | | | |
| | 002520 | | | IS THE A/D OUT- |
| 050770 | 022700 | | CMP #980., R0 | PUT GREATER THAN |
| | 001724 | | | 9 VOLTS? IF YES RESET. |
| 050774 | 003750 | | BLE LINK | |
| 050776 | 060067 | | ADD R0, Y+2 | SUM THE Y VALUE FOR THE |
| | 002514 | | | |
| 051002 | 005567 | | ADC Y | REGRESSION. |
| | 002506 | | | |
| 051006 | 016701 | | MOV X, R1 | MULTIPLY THE X BY THE Y |
| | 002506 | | | |
| 051012 | 004767 | | JSR PC.MULTY | |
| | 001062 | | | |
| 051016 | 060167 | | ADD R1,XY+2 | |

-continued

| | 002514 | | SUM THE XY VALUE |
|---|---|---|---|
| 051022 | 005567 | ADC XY | FOR THE |
| | 002506 | | REGRSSSION. |
| 051026 | 060067 | ADD R0,XY | |
| | | | |
| | 002502 | | |
| 051032 | 005367 | DEC X; | REDUCE X VALUE BY 1 |
| | 002462 | | IF X=0 IT IS TIME TO |
| 051036 | 001402 | BEQ CALC; | CALCULATE THE SLOPE |
| 051040 | 004767 | JSR PC,RESTORE | |
| | 001312 | | |
| 051044 | 016767 | CALC: MOV N,X; | RESET THE X VALUE |
| | 002500 | | |
| | 002446 | | |
| 051052 | 016767 | MOV Y,YC | |
| | 002436 | | STORE THE |
| | 002464 | | $\Sigma Y$ |
| 051060 | 016767 | MOV Y+2,YC+2 | |
| | 002432 | | |
| | 002460 | | |
| 051066 | 016767 | MOV XX,XYC | |
| | 002442 | | |
| | | | STORE THE $\Sigma X$ |
| | 002444 | | |
| 051074 | 016767 | MOV XY+2,XYC+2 | |
| | 002436 | | |
| | 002440 | | |
| 051102 | 005067 | CLR XY | |
| | 002426 | | RESET $\Sigma XY$ AND |
| 051106 | 005067 | CLR XY+2 | $\Sigma Y$ FOR NEXT |
| | 002424 | | SAMPLE PERIOD. |
| 051112 | 005067 | CLR Y | |
| | 002376 | | |
| 051116 | 005067 | CLR Y+2 | |
| | 002374 | | |
| 051122 | 016746 | MOV N1+2,(SP)− | |
| | 002426 | | PUT # SAMPLES |
| | RQ at GE | 007 | ON THE STACK. |
| 051126 | 016746 | MOV N1, (SP)− | |
| | 002420 | | |
| 051132 | 016700 | MOV XYC, R0 | |
| | 002402 | | |
| 051136 | 016701 | MOV XYC+2,R1 | CONVERT $\Sigma XY$ TO |
| | 002400 | | A FLOATING POINT |
| 051142 | 004767 | JSR PC,DFLOAT | # AND PUT IT ON |
| | 000620 | | THE STACK. |
| 051146 | 004467 | JSR R4,$POLSH | |
| | 013774 | | |
| 051152 | 064412 | $MLR | (#SAMPLES) × |
| 051154 | 051156 | .WORD .+2 | $\Sigma XY$ |
| 051156 | 016746 | MOV X1+2,(SP)− | |
| | 002350 | | PUT X ON |
| 051162 | 016746 | MOV X1,(SP)− | STACK |
| | 002342 | | |
| 051166 | 016700 | MOV YC, R0 | CONVERT $\Sigma Y$ TO |
| | 002352 | | FLOATING POINT |
| 051172 | 016701 | MOV YC+2,R1 | AND PUT IT ON |
| | 002350 | | THE STACK. |
| 051176 | 004767 | JSR PC,DFLOAT | |
| | 000564 | | |
| 051202 | 004467 | JSR R4,$POLSH | |
| | 013740 | | GET (#SAMPLES) |
| 051206 | 064412 | $MLR | ($\Sigma XY$)$\Sigma X \Sigma Y$ |
| 051210 | 057446 | $SBR | |
| 051212 | 051214 | .WORD .+2 | |
| 051214 | 016746 | MOV N1+2, (SP)− | PUT #SAMPLES |
| | 002334 | | ON THE STACK. |

| | | | |
|---|---|---|---|
| 051220 | 016746 | MOV N1, (SP)— | |
| | 002326 | | |
| 051224 | 016746 | MOV X2+2,(SP)— | PUTΣX² ON |
| | 002276 | | STACK. |
| 051230 | 016746 | MOV X2, (SP)— | |
| | 002270 | | |
| 051234 | 004467 | JSR R4,$POLSH | GET (#SAMPLES) |
| | 013706 | | (ΣX²) |
| 051240 | 064412 | $MLR | |
| 051242 | 051244 | .WORD .+2 | |
| 051244 | 016746 | MOV X1+2,(SP)— | PUT ΣX ON |
| | 002262 | | STACK. |
| 051250 | 016746 | MOV X1,(SP)— | |
| | 002254 | | |
| 051254 | 016746 | MOV X1+2,(SP)—; | ΣX ON STACK AGAIN |
| | 002252 | | |
| 051260 | 016746 | MOV X1,(SP)— | |
| | 002244 | | |
| 051264 | 004467 | JSR R4,$POLSH | |
| | 013656 | | |
| 051270 | 064412 | $MLR | $\frac{100(\#SAMPLES)(\Sigma xy) - (\Sigma x)(\Sigma y)}{(\#SAMPLES)(\Sigma x^2) - (\Sigma x)\Sigma y)}$ |
| | RQ at GE 010 | | SLOPE |
| 051272 | 057446 | $SBR | |
| 051274 | 063500 | $DVR | |
| 051276 | 064772 | $NGR | |
| 051300 | 051302 | .WORD .+2 | |
| 051302 | 016746 | MOV SAMS01+2,(SP)— | PUT #SAMPLES/ |
| | 002252 | | SECOND ON |
| 051306 | 016746 | MOV SAMS01,(SP)— | STACK |
| | 002244 | | |
| 051312 | 004467 | JSR R4,$POLSH | |
| | 013630 | | |
| 051316 | 064412 | $MLR | |
| 051320 | 051322 | .WORD .+2 | |
| 051322 | 005046 | CLR (SP)— | |
| 051324 | 012746 | MOV #041710,(SP)—; | FLOATING POINT |
| | 041710 | | 100 |
| 051330 | 004467 | JSR R4,$POLSH | |
| | 013612 | | |
| 051334 | 063500 | $DVR; | $\frac{VOLT}{SEC} = SLOPE \times \frac{SAMPLE}{SEC} \times \frac{1}{100}$ |
| 051336 | 051340 | .WORD .+2 | |
| 051340 | 011667 | MOV (SP),TEMP | STORE V/S FOR |
| | 002216 | | LATER USE. |
| 051344 | 016667 | MOV 2(SP),TEMP+2 | |
| | 000002 | | |
| | 002212 | | |
| 051352 | 016746 | MOV PREV+2,(SP)— | PUT PREVIOUS |
| | 002212 | | V/S ON STACK |
| 051356 | 016746 | MOV PREV,)SP)— | |
| | 002204 | | |
| 051362 | 004467 | JSR R4,$POLSH | PREV − CURRENT |
| | 051360 | | V/S. |
| 051366 | 057446 | $SBR | |
| 051370 | 051372 | .WORD .+2 | |
| 051372 | 032716 | BIT #100000,(SP) | |
| | 100000 | | GET THE |
| 051376 | 001404 | BEQ OVR | ABSOLUTE VALUE |

-continued

| | | | |
|---|---|---|---|
| 051400 | 004467 | JSR R4, $POLSH | \|PREV V/S− |
| | 013542 | | CURRENT V/S\| |
| 051404 | 064772 | $NGR | |
| 051406 | 051410 | .WORD .+2 | |
| 051410 | 005767 | OVR: TST ERRSW | LARGE OR SMALL |
| | 002156 | | ERROR BAND? |
| 051414 | 001410 | BEQ LARGE | |
| 051416 | 005367 | DEC ERRSW-SMALL- | DECREASE #SMALL SAMPLES BEFORE SWITCHING ERROR bands. |
| | 002150 | | |
| 051422 | 001405 | BEQ LARGE | |
| 051424 | 016746 | MOV SE+2,(SP)− | MOVE SMALL |
| | 002150 | | ERROR BAND |
| 051430 | 016746 | MOV SE,(SP)− | ONTO STACK. |
| | 002142 | | |
| 051434 | 000404 | BR TSTE; | TEST FOR ACRILOK |
| | RQ at GE | 011 | |
| 051436 | 016746 | LARGE: MOV LE+2,(SP)− | MOVE LARGE |
| | 002142 | | ERROR BAND |
| 051442 | 016746 | MOV LE,(SP)− | ONTO STACK. |
| | 002154 | | |
| 051446 | 004467 | TSTE: JSR R4, $POLSH | COMPARE |
| | 013474 | | \|PREV V/S− |
| 051452 | 060206 | $CMR | CURRENT V/S\| |
| 051454 | 051456 | .WORD .+2 | TO ALLOWABLE |
| 051456 | 003402 | BLE .+6 | ERROR IN V/S |
| 051460 | 000167 | JMP ACRILOCK | AND JMP IF TOO LARGE. |
| | 000630 | | |
| 051464 | 016767 | MOV TEMP,PREV; | THIS IS .+6 |
| | 002072 | | YOU ARE WITHIN |
| | 002074 | | THE ERROR BAND |
| 051472 | 016767 | MOV TEMP+2,PREV+2 | (STORE THE FEED |
| | 002066 | | RATE IN V/S |
| | 002070 | | |
| 051500 | 005267 | INC UPDAT; | SET THE FLAG TO INDICATE A NEW FEED RATE HAS JUST BEEN CALCULATED |
| | 002002 | | |
| 051504 | 005767 | TST LOS | ARE WE USING |
| | 002102 | | LARGE OR SMALL |
| 051510 | 001451 | BEQ LAR | SAMPLES? |
| 051512 | 005367 | DEC LOS: | DECREMENT # OF SMALL SAMPLES. |
| | 002074 | | |
| 051516 | 016746 | UPDATE: MOV K+2,(SP)− | PUT OUTPUT |
| | 002076 | | CONSTANT |
| 051522 | 016746 | MOV K, (SP)− | (SYSTEM GAIN) |
| | 002070 | | ON THE STACK. |
| 051526 | 016746 | MOV FR +2 (SP)− | PUT DESIRED |
| | 002072 | | FEED RATE ON |
| 051532 | 016746 | MOV FR, (SP)− | THE STACK. |
| | 002064 | | |
| 051536 | 016746 | MOV PREV+2, (SP)− | PUT CURRENT |
| | 002026 | | FEED RATE ON |
| 051542 | 016746 | MOV PREV,(SP)− | THE STACK. |

-continued

|   |   |   |   |
|---|---|---|---|
|   | 002020 |   |   |
| 051546 | 004467 | JSR R4, $POLSH |   |
|   | 013374 |   |   |
| 051552 | 057446 | $SBR | (CURRENT-DESIR- |
| 051554 | 064412 | $SMLR | ED)K + CONWOR |
| 051556 | 065024 | $RI | PREVIOUS MOTOR |
| 051560 | 051562 | .WORD .+2 | SPEED. |
| 051562 | 062667 | ADD (SP)+,CONWOR |   |
|   | 002040 |   |   |
| 051566 | 026727 | CMP CONWAR,#2000 | IF RESULT IS |
|   | 002034 |   | GREATER THAN |
|   | 002000 |   | 2000 (6V at |
| 051574 | 100403 | BMI CNTU | OUTPUT OF D/A) |
| 051576 | 012767 | MOV #1777,CONWOR | MAKE IT=2000; I.E., LIMIT |
|   | 001777 |   | RESULT TO 6 VOLTS |
|   | 002022 |   |   |
|   | RQ at GE |   |   |
| 051604 | 042767 | CNTU: BIC#02,SET; | GET SET TO UPDATE MOTOR SPEED. |
|   | 000002 |   |   |
|   | 125736 |   |   |
| 051612 | 005167 | COM CONWOR | THE D/A USES |
|   | 002010 |   | NEGATIVE LOGIC. |
| 051616 | 016767 | MOV CONWOR, OUT |   |
|   | 002004 |   |   |
|   | 125730 |   |   |
| 051624 | 005167 | COM CONWOR; | BUT THE PROGRAMMER PREFERS TO THINK POSITIVE. |
|   | 001776 |   |   |
| 051630 | 004767 | JSR PC,RESTORE; | GO BACK TO WHERE YOU WERE BEFORE BEING RUDELY INTERRUPTED. |
|   | 000522 |   |   |
| 051634 | 016746 | LAR: MOV PREV+2,(SP)− |   |
|   | 001730 |   | IF YOU ARE |
| 051640 | 016746 | MOV PREV,(SP)− | CALLING FOR LARGE SAMPLES, |
|   | 001722 |   | I.E. AN AVERAGE |
| 051644 | 016746 | MOV AVG+2,(SP)− | OF THE V/S |
|   | 001762 |   | CALCULATIONS, |
| 051650 | 016746 | MOV AVG, (SP)− | THEN YOU ARE |
|   | 001754 |   | HERE. COMPUTE |
| 051654 | 004467 | JSR R4,$POLSH | THE RUNNING |
|   | 013266 |   | AVERAGE. |
| 051660 | 057452 | $ADR |   |
| 051662 | 051664 | .WORD .+2 |   |
| 051664 | 005767 | TST SSLST |   |
|   | 001744 |   | IF YOU HAVE |
| 051670 | 001411 | BEQ CALL | ENOUGH V/S |
| 051672 | 005367 | DEC SSLST | CALCULATIONS |
|   | 001736 |   | USE THE |
| 051676 | 001406 | BEQ CALL | AVERAGE;I.E. JUMP TO CALL. |
| 051700 | 012667 | MOV (SP)+,AVG. | YOU DON'T HAVE ENOUGH V/S |
|   | 001724 |   |   |
| 051704 | 012667 | MOV (SP)+,AVG+2 | CALCULATIONS. RETURN TO WHERE |
|   | 001722 |   |   |
| 051710 | 004767 | JSR PC,RESTORE | YOU WERE BEFORE THE INTERRUPT. |
|   | 000442 |   |   |
| 051714 | 016767 | CALL: MOV RESET RESET # SMALL |   |
|   | 001716 |   | SAMPLES PER |
|   | 001712 |   | LARGE SAMPLE |
| 051722 | 016746 | MOV SSLSTR+2,(SP)− | TIME. |
|   | 001714 |   |   |
| 051726 | 016746 | MOV SSLSTR,(SP)−; | PUT # SMALL SAMPLES/LARGE SAM |

-continued

| | | | | |
|---|---|---|---|---|
| | 001706 | | | ON STACK. |
| 051732 | 004467 | | JSR R4,SPOLSH | GET THE AVER. |
| | 013210 | | | OF THE SMALL |
| 051736 | 063500 | | $DVR | SAMPLES COM- |
| 051740 | 051742 | | .WORD .+2 | PRISING THE |
| | | | | LARGE SAMPLE. |
| 051742 | 012667 | | MOV (SP)+,PREV | |
| | 001620 | | STORE THE | |
| 051746 | 012667 | | MOV (SP)+,PREV+2 | AVERAGE. |
| | 001616 | | | |
| | RQ at GE | 013 | | |
| 051752 | 005067 | | CLR AVG | RESET THE AVG. |
| | 001652 | | | |
| 051756 | 005067 | | CLR AVG+2 | |
| | 001650 | | | |
| 051762 | 000167 | | JMP UPDATE; | REFRESH THE MOTOR |
| | 177530 | | | SPEED. |
| 051766 | 012667 | DEFLOAT: | MOV (SP)+,RTRN | |
| | 000104 | | | |
| 051772 | 005046 | | CLR (SP)− | |
| 051774 | 005046 | | CLR −(SP) | |
| 051776 | 005700 | | TST R0 | |
| 052000 | 003007 | | BGT POS27 | |
| 052002 | 002403 | | BLT OVE27 | |
| 052004 | 005701 | | TST R1 | |
| 052006 | 001432 | | BEQ ZER27 | |
| 052010 | 000403 | | BR POS27 | |
| 052012 | 005401 | OVE27: | NEG R1 | |
| 052014 | 005400 | | NEG R0 | |
| 052016 | 005601 | | SBC R1 | |
| 052020 | 006146 | POS27: | ROL −(SP) | |
| 052022 | 000241 | | CLC | |
| 052024 | 012702 | | MOV #240,R2 | |
| | 000240 | | | |
| 052030 | 006101 | NOM 27: | ROL R1 | |
| 052032 | 006100 | | ROL R0 | |
| 052034 | 103402 | | BCS NOD27 | DOUBLE |
| 052036 | 005302 | | DEC R2 | PRECISION |
| 052040 | 000773 | | BR NOM27 | INTEGER TO |
| 052042 | 000301 | NOD27: | SWAB R1 | FLOATING POINT |
| 052044 | 110166 | | MOVB R1,4(SP) | SUBROUTINE |
| | 000004 | | | |
| 052050 | 110066 | | MOVB R0,5(SP) | |
| | 000005 | | | |
| 052054 | 105000 | | CLRB R0 | |
| 052056 | 150200 | | BISB R2,R0 | |
| 052060 | 000300 | | SWAB R0 | |
| 052062 | 006026 | | ROR (SP)+ | |
| 052064 | 006000 | | ROR | R0 |
| 052066 | 006066 | | ROR 2(SP) | |
| | 000002 | | | |
| 052072 | 010016 | | MOV R0,atSP | |
| 052074 | 000137 | ZER27: | JMP at(PC)+ | |
| 052076 | 000000 | RTRN: | 0 | |
| 052100 | 005002 | MULTY: | CLR R2 | INTEGER MULTIPLY |
| 052102 | 005004 | | CLR R4 | SUBROUTINE |
| 052104 | 012703 | | MOV #16.,R3 | 16BIT × 16BIT = |
| | 000020 | | | 32 BIT RESULT. |
| 052110 | 006200 | | ASR R0 | |
| 052112 | 103001 | MR: | BCC .+4 | |
| 052114 | 060102 | | ADD R1,R2 | |
| | RQ at GE | 014 | | |
| 052116 | 006002 | | ROR R2 | |
| 052120 | 006000 | | ROR R0 | |
| 052122 | 005303 | | DEC R3 | |
| 052124 | 001372 | | BNE MR | |
| 052126 | 010001 | | MOV R0,R1 | |
| 052130 | 010200 | | MOV R2,R0 | |
| 052132 | 000207 | | PTS | PC |
| 052134 | 052767 | RESET. | BIS#2,SET | WHEN A/D OUTPUT |
| | 000002 | | | RAMPS GREATER |
| | 125406 | | | THAN 9V LIMIT |
| 052142 | 062767 | | ADD#17,OFFDAC | RESET IT CLOSE |
| | 000017 | | | TO ZERO BY |
| | 000136 | | | CHANGING THE |
| 052150 | 016767 | | MOV OFFDAC,OFFSET | OFFSET VALUE & |

|        |        |                               |                        |
|--------|--------|-------------------------------|------------------------|
|        | 000132 |                               | COMPARING,             |
|        | 125376 |                               | LOOPING. NOTE          |
| 052156 | 012767 | MOV #24150,LOOP1;90 MILLISEC  | THE RESPONSE           |
|        | 024150 |                               | TIME OF 90             |
|        | 000124 |                               | MILLISEC FOR           |
| 052164 | 005367 | A:DEC LOOP1                   | LARGE STEPS, &         |
|        | 000120 |                               | WHEN YOU GET           |
| 052170 | 001375 | BNE A                         | CLOSE TO ZERO,         |
| 052172 | 062767 | RESETA:ADD #1,OFFDAC          | RESPONSE TIME          |
|        | 000001 |                               | OF 5 MILLI-            |
|        | 000106 |                               | SECONDS.               |
| 052200 | 016767 | MOV OFFDAC,OFFSET             |                        |
|        | 000102 |                               |                        |
|        | 125346 |                               |                        |
| 052206 | 012767 | MOV #4440,LOPP1; 5MILLISEC    |                        |
|        | 004440 |                               |                        |
|        | 000074 |                               |                        |
| 052214 | 005367 | B: DEC LOOP1                  |                        |
|        | 000070 |                               |                        |
| 052220 | 001375 | BNE B                         |                        |
| 052222 | 005267 | INC SET                       |                        |
|        | 125322 |                               |                        |
| 052226 | 105767 | WATHO: TSTB SET               |                        |
|        | 125316 |                               |                        |
| 052232 | 100375 | BPL WATHO                     |                        |
| 052234 | 026727 | CMP DATA,#177631              |                        |
|        | 125312 |                               |                        |
|        | 177631 |                               |                        |
| 052242 | 100001 | BPL CONTIN                    |                        |
| 052244 | 000752 | BR RESETA                     |                        |
| 052246 | 016767 | CONTIN: MOV N,X               |                        |
|        | 001276 |                               |                        |
|        | 001244 |                               |                        |
| 052254 | 016767 | MOV INTSA,INTS;               | RESET # INTER-         |
|        |        |                               | RUPTS/SAMPLE           |
|        | 001232 |                               |                        |
|        | 001226 |                               |                        |
|        | RQ at GE | 015                         |                        |
| 052262 | 005067 | CLR Y                         |                        |
|        | 001226 |                               | ZERO THE SUMS;         |
| 052266 | 005067 | CLR Y+2                       | THROW OUT THIS         |
|        | 001224 |                               | SAMPLE PERIOD          |
| 052272 | 005067 | CLR XY                        | DUE TO THE             |
|        | 001236 |                               | NEED FOR RE-           |
| 052276 | 005067 | CLR XY+2                      | SETTING.               |
|        | 001234 |                               |                        |
| 052302 | 004767 | JSR PC,RESTORE;               | RETURN TO PREVIOUS     |
|        |        |                               | TASK.                  |
|        | 000050 |                               |                        |
| 052306 | 000000 | OFFDAC: 0                     |                        |
| 052310 | 000000 | LOOP1: 0                      |                        |
| 052312 | 000000 | HPREMP: HALT;                 | IF HOPPER IS EMPTY HALT. |
| 052314 | 005267 | ACRILOCK: INC ACRILK          |                        |
|        | 001266 |                               | SET ACRILOCK           |
| 052320 | 005267 | INC UPDAT                     | FLAG.                  |
|        | 001162 |                               |                        |
| 052324 | 004767 | JSR PC,RESTORE                |                        |
|        | 000026 |                               |                        |
| 052330 | 012667 | SAVE: MOV (SP)+, SAV          |                        |
|        | 000016 |                               |                        |
| 052334 | 010046 | MOV R0,(SP)−                  |                        |
| 052336 | 010146 | MOV R1,(SP)−                  |                        |
| 052340 | 010246 | MOV R2,(SP)−                  | SAVE SUBROUTINE        |
| 052342 | 010346 | MOV R3,(SP)−                  |                        |
| 052344 | 010446 | MOV R4,(SP)−                  |                        |
| 052346 | 010546 | MOV R5,(SP)−                  |                        |
| 052350 | 000137 | JMP AT(PC)+                   |                        |
| 052352 | 000000 | SAV: 0                        |                        |
| 052354 | 000000 | SAV1: 0                       |                        |
| 052356 | 005726 | RESTORE: TST (SP)+            |                        |
| 052360 | 012605 | MOV (SP)+,R5                  |                        |
| 052362 | 012604 | MOV (SP)+,R4                  |                        |
| 052364 | 012603 | MOV (SP)+,R3                  | RESTORE                |
| 052366 | 012602 | MOV (SP)+,R2                  | SUBROUTINE.            |
| 052370 | 012601 | MOV (SP)+,R1                  |                        |
| 052372 | 012600 | MOV (SP)+,R0                  |                        |
| 052374 | 000002 | RTI                           |                        |
| 052376 | 016746 | INIT: MOV TABLE1+12,(SP)−;    | # SAMPLES              |

| | | | |
|---|---|---|---|
| | 176010 | | YOU COME HERE AFTER ANSWERING QUESTIONS TO |
| 052402 | 016746 | MOV TABLE1+10,(SP)− | ESTABLISH A NEW SET OF |
| | 176002 | | OPERATING PARAMETERS. |
| 052406 | 004467 | JSR R4,$POLSH | |
| | 012534 | | |
| 052412 | 065024 | $RI | |
| 052414 | 052416 | .WORD .+2 | |
| 052416 | 012667 | MOV (SP)+,HOLD | INTEGER # SAMPLES. |
| | 001226 | | |
| 052422 | 016746 | MOV TABLE1+12,(SP)− | |
| | 175764 | | |
| 052426 | 016746 | MOV TABLE1+10,(SP)− | |
| | 175756 | | |
| 052432 | 016746 | MOV TABLE 1+12,(SP)− | CALCULATE NEW |
| | 175754 | | $\Sigma X = \frac{x(x+1)}{2}$ |
| 052436 | 016746 | MOV TABLE1+10, (SP)− | |
| | 175746 | | |
| 052442 | 005046 | CLR (SP)− | |
| 052444 | 012746 | MOV #ONEF,(SP)− | |
| | 040200 | | |
| 052450 | 004467 | JSR R4,$POLSH | |
| | 012472 | | |
| 052454 | 057452 | $ADR | |
| 052456 | 064412 | $MLR | |
| 052460 | 052462 | WORD .+2 | |
| 052462 | 005046 | CLR (SP)− | |
| 052464 | 012746 | MOV #TWOF,(SP)− | |
| | 040400 | | |
| 052470 | 004467 | JSR R4, $POLSH | |
| | 012452 | | |
| 052474 | 063500 | $DVR | |
| 052476 | 052500 | .WORD .+2 | |
| 052500 | 012667 | MOV (SP)+,HOLD1 | PUT IT IN STORAGE |
| | 001146 | | |
| 052504 | 012667 | MOV (SP)+,HOLD2 | |
| | 001144 | | |
| 052510 | 005046 | CLR (SP)− | |
| 052512 | 012746 | MOV #ONEF,(SP)− | |
| | 040200 | | |
| 052516 | 016746 | MOV TABLE1+12,(SP)− | |
| | 175670 | | |
| 052522 | 016746 | MOV TABLE1+10,(SP) | |
| | 175662 | | |
| 052526 | 005046 | CLR (SP)− | |
| 052530 | 012746 | MOV #TWOF,(SP)− | |
| | 040400 | | |
| 052534 | 004467 | JSR R4,$POLSH | |
| | 012406 | | |
| 052540 | 064412 | $MLR | |
| 052542 | 057452 | $ADR | |
| 052544 | 052546 | .WORD .+2 | CALCULATE NEW |
| 05246 | 016746 | MOV TABLE1+12 (SP)− | $\Sigma X^2 = \frac{(2x+1)(x+1)(x)}{6}$ |
| | 175640 | | |
| 052552 | 016746 | MOV TABLE1+10,(SP)− | |
| | 175632 | | |
| 052556 | 016746 | MOV TABLE1+12,(SP)− | |
| | 175630 | | |
| 052562 | 016746 | MOV TABLE1+10,(SP)− | |
| | 175622 | | |
| 052566 | 005046 | CLR (SP)− | |
| 052570 | 012746 | MOV #ONEF,(SP)− | |
| | 040200 | | |
| 052574 | 004467 | JSR R4,$POLSH | |
| | 012346 | | |
| 052600 | 057452 | $ADR | |
| 052602 | 064412 | $MLR | |
| 052604 | 064412 | $MLR | |
| 052606 | 052610 | .WORD .+2 | |
| 052610 | 005046 | CLR (SP)− | |
| 052612 | 012746 | MOV #SIXF,(SP)− | |
| | 040700 | | |
| 052616 | 004467 | JSR R4,$POLSH | |
| | 012324 | | |
| 052622 | 063500 | $DVR | |
| 052624 | 052626 | .WORD .+2 | |

-continued

| | | | |
|---|---|---|---|
| 052626 | 012667<br>001024 | MOV (SP)+,HOLD3 | PUT IT IN<br>STORAGE |
| 052632 | 012667 | MOV (SP)+,HOLD4 | |
| | 001022 | | |
| 052636 | 016746<br>175600 | MOV TABLE1+42,(SP)— | CONVERT NEW<br># SMALL |
| 052642 | 016746<br>175572 | MOV TABLE1+40,(SP)— | SAMPLES BE-<br>FORE SWITCH- |
| 052646 | 004467<br>012274 | JSR R4,$POLSH | ING ERROR<br>BANDS &<br>CONVERT TO |
| 052652 | 065024 | SRI | INTEGER |
| 052654 | 052656 | .WORD .+2 | |
| 052656 | 012667<br>001000 | MOV (SP)+,HOLD5; | PUT IT IN<br>STORAGE |
| 052662 | 016746<br>175534 | MOV TABLE1+22,(SP)— | CONVERT NEW<br>#SMALL |
| 052666 | 016746<br>175526 | MOV TABLE1+20,(SP)— | SAMPLES PER<br>LARGE SAMPLE |
| 052672 | 004467<br>012250 | JSR R4,$POLSH | & CONVERT TO<br>INTEGER. |
| 052676 | 065024 | SRI | |
| 052700 | 052702 | .WORD .+2 | |
| 052702 | 012667<br>000756 | MOV (SP)+,HOLD6; | PUT IT IN<br>STORAGE |
| 052706 | 016746<br>175520 | MOV TABLE1+32,(SP)— | CONVERT NEW #<br>SMALL SAMPLES |
| 052712 | 016746<br>175512 | MOV TABLE1+30,(SP)— | BEFORE SWITCH-<br>ING TO LARGE |
| 052716 | 004467<br>012224 | JSR R4,$POLSH | SAMPLES &<br>CONVERT TO |
| 052722 | 065024 | SRI | INTEGER. |
| 052724 | 052726 | .WORD .+2 | |
| 052726 | 012667<br>000734 | MOV (SP)+,HOLD7; | PUT IT IN<br>STORAGE |
| 052732 | 005067<br>124612 | CLR LKS; | TURN OFF THE REAL TIME<br>CLOCK |
| 052736 | 005067<br>000572 | CLR XY | |
| | RQ at GE | 020 | ZERO THE |
| 052742 | 005067<br>000570 | CLR XY+2 | SUMS. |
| 052746 | 005067<br>000542 | CLR Y | |
| 052752 | 005067<br>000540 | CLR Y+2 | |
| 052756 | 016767<br>000706<br>00572 | MOV HOLD8,SAMS01 | |
| 052764 | 016767<br>000702<br>000566 | MOV HOLD9,SAMS01+2 | |
| 052772 | 016767<br>000670<br>000612 | MOV HOLD7,LOS | |
| 053000 | 016767<br>000660<br>000626 | MOV HOLD6,SSLST | |
| 053006 | 016767<br>000650<br>000556 | MOV HOLD5,ERRSW | |
| 053014 | 016767<br>000640<br>000504 | MOV HOLD4,X2+2 | |
| 053022 | 016767<br>000630<br>000474 | MOV HOLD3,X2 | |
| 053030 | 016767<br>000620<br>000474 | MOV HOLD2,X1+2 | |
| 053036 | 016767 | MOV HOLD1,X1 | |
| 053044 | 016767 | MOV HOLD,N | |

-continued

| | | | | |
|---|---|---|---|---|
| | 000600 | | | |
| | 000476 | | | |
| 053052 | 016767 | | MOV SSLST,SSLSTI | |
| | 000556 | | | |
| | 000556 | | | |
| 053060 | 016767 | | MOV N,X | |
| | 000464 | | | |
| | 000432 | | | |
| 053066 | 016767 | | MOV TABLE1,FR | |
| | 175306 | | | MOVE THE NEW |
| | 000526 | | | PARAMETERS INTO |
| 053074 | 016767 | | MOV TABLE1+2,FR+2 | REAL TIME |
| | 175302 | | | VARIABLES |
| | 000522 | | | DURING THE |
| 053102 | 016767 | | MOV TABLE1+10,N1 | TIME WHEN THE |
| | 175302 | | | CLOCK IS OFF |
| | 000442 | | | SO THAT THE |
| | RQ at GE | 021 | | TRANSITION |
| 053110 | 016767 | | MOV TABLE1+12,N1+2 | DOES NOT OCCUR |
| | 175276 | | | IN THE MIDDLE |
| | 000436 | | | OF A SAMPLE |
| 053116 | 016767 | | MOV TABLE1+14,SE | PERIOD. |
| | 175272 | | | |
| | 000452 | | | |
| 053124 | 016767 | | MOV TABLE1+16,SE+2 | |
| | 175266 | | | |
| | 000446 | | | |
| 053132 | 016767 | | MOV TABLE1+34,LE | |
| | 175276 | | | |
| | 000442 | | | |
| 053140 | 016767 | | MOV TABLE1+36LE+2 | |
| | 175272 | | | |
| | 000436 | | | |
| 053146 | 016767 | | MOV TABLE1+24,K | |
| | 175252 | | | |
| | 000442 | | | |
| 053154 | 016767 | | MOV TABLE1+26,K+2 | |
| | 175246 | | | |
| | 000436 | | | |
| 053162 | 016767 | | MOV INTSAM,INTSA | |
| | 000506 | | | |
| | 000322 | | | |
| 053170 | 016767 | | MOV INTSA,INTS | |
| | 000316 | | | |
| | 000312 | | | |
| 053176 | 016767 | | MOV TABLE1+20SSLSTR | |
| | 175216 | | | |
| | 000434 | | | |
| 053204 | 016767 | | MOV TABLE1+22SSLSTR+2 | |
| | 175212 | | | |
| | 000430 | | | |
| 053212 | 005067 | | CLR AVG | ZERO AVG. |
| | 000412 | | | |
| 053216 | 005067 | | CLR AVG+2 | |
| | 000410 | | | |
| 053222 | 016706 | | MOV STKST,SP | RESET THE |
| | 000420 | | | STACK |
| 053226 | 005746 | | TST (SP)− | |
| 053230 | 052767 | | BIS #40,LKS; | TURN ON THE REAL TIME CLOCK. |
| | 000040 | | | |
| | 124312 | | | |
| 053236 | 005767 | TEST: | TST UPDAT; | HAS A NEW FEEDRATE BEEN CALCULATED? |
| | 000244 | | | |
| 053242 | 001003 | | BNE NEWDAT; | YES PRINT IT |
| 053244 | 000001 | | WAIT; | NO-WAIT FOR INTERRUPT. |
| 053246 | 000167 | | JMP TEST; | RETURN HERE FROM INTERRUPT. |
| | 177764 | | | |
| 053252 | 005267 | NEWDAT: | INC CR | |
| | 000160 | | | |
| | RQ at GE | 022 | | |
| 053256 | 005767 | | TST ACRILK | |
| | 000324 | | | |
| 053262 | 001407 | | BEQ AB | |
| 053264 | 016767 | | MOV TEMP,TEM | |
| | 000272 | | | |
| | 000210 | | | |
| 053272 | 016767 | | MOV TEMP+2,TEM+2 | |
| | 000266 | | | |
| | 000204 | | | |

-continued

| | | | |
|---|---|---|---|
| 053300 | 000406 | BR ABC | |
| 053302 | 016767 | AB: MOV PREV,TEM | |
| | 000260 | | |
| | 000172 | | |
| 053310 | 016767 | MOV PREV+2,TEM+2 | |
| | 000254 | | |
| | 000166 | | |
| 053316 | 005067 | ABC: CLR UPDAT | |
| | 000164 | | |
| 053322 | 012746 | MOV #BUFF,(SP)— | |
| | 053456 | | |
| 053326 | 012746 | MOV #14.,(SP)— | |
| | 000016 | | |
| 053332 | 012746 | MOV #5,(SP)— | |
| | 000005 | | |
| 053336 | 005046 | CLR (SP)— | |
| 053340 | 016746 | MOV TEM+2,(SP)— | |
| | 000140 | | |
| 053344 | 016746 | MOV TEM,(SP)— | |
| | 000132 | | |
| 053350 | 004767 | JSR PC,$GCO | |
| | 006310 | | |
| 053354 | 005767 | TST ACRILK | |
| | 000226 | | |
| 053360 | 001405 | BEQ AC | |
| 053362 | 012767 | MOV #'*,BUFF | PRINT OUT |
| | 000052 | | NEW FEED |
| | 000066 | | RATE ON TTY; |
| 053370 | 005067 | CLR ACRILK | 5 PRINTOUTS |
| | 000212 | | PER LINE, WITH |
| 053374 | 022767 | AC: CMP #5,CR | * IF IN |
| | 000005 | | ACRILOK. |
| | 000034 | | |
| 053402 | 001005 | BNE OUT! | |
| 053404 | 005067 | CLR CR | |
| | 000026 | | |
| 053410 | 000004 | IOT | |
| 053412 | 053440 | .WORD CRLF | |
| 053414 | 012 | .BYTE WRITE,1 | |
| 053414 | 001 | | |
| 053416 | 000004 | OUT!: IOT | |
| | RQ at GE | 023 | |
| 053420 | 053450 | .WORD BBUFF | |
| 053422 | 012 | .BYTE WRITE,1 | |
| 053423 | 001 | | |
| 053424 | 000004 | WAIT: IOT | |
| 053426 | 053424 | .WORD WAIT | |
| 053430 | 004 | .BYTE WAITR,1 | |
| 053431 | 001 | | |
| 053432 | 000167 | JMP TEST | |
| | 177600 | | |
| 053436 | 000000 | CR:0 | |
| 053440 | 000002 | CRLF: 2 | |
| 053442 | 000000 | 0 | |
| 053444 | 000002 | 2 | |
| 053446 | 015 | .BYTE 15,12 | |
| 053447 | 012 | | |
| 053450 | 000016 | BBUFF: 14. | |
| 053452 | 000000 | 0 | |
| 053454 | 000016 | 14. | |
| | 053502 | BUFF: .=.+20. | |
| | 053506 | TEM: .=.+4 | |
| 053506 | 000000 | UPDAT: 0 | |
| 053510 | 000000 | INTS: 0 | |
| 053512 | 000000 | INTSA: 0 | |
| 053514 | 000000 | Y: 0,0 | |
| 053516 | 000000 | | |
| 053520 | 000000 | X: 0,0 | |
| 053522 | 000000 | | |
| 053524 | 000000 | X2: 0,0 | |
| 053526 | 000000 | | |
| 053530 | 000000 | X1: 0,0 | |
| 053532 | 000000 | | |
| 053534 | 000000 | XY: 0,0 | |
| 053536 | 000000 | | |
| 053540 | 000000 | XYC: 0,0 | |
| 053542 | 000000 | | |
| 053544 | 000000 | YC: 0,0 | |
| 053546 | 000000 | | |
| 053550 | 000000 | N: 0 | |
| 053552 | 000000 | N1: 0,0 | |
| 053554 | 000000 | | |
| 053556 | 000000 | SAMS01: 0,0 | |
| 053560 | 000000 | | LOCATIONS |
| 053562 | 000000 | TEMP: 0,0 | FOR |
| 053564 | 000000 | | VARIABLES, |
| 053566 | 000000 | PREV: 0,0 | FLAGS, |
| 053570 | 000000 | | AND |
| 053572 | 000000 | ERRSW: 0,0 | BUFFERS |
| 053574 | 000000 | | |

-continued

| | | | |
|---|---|---|---|
| 053576 | 000000 | SE: | 0,0 |
| 053600 | 000000 | | |
| | | RQ at GE | 024 |
| 053602 | 000000 | LE: | 0,0 |
| 053604 | 000000 | | |
| 053606 | 000000 | ACRILK: | 0,0 |
| 053610 | 000000 | | |
| 053612 | 000000 | LOS: | 0,0 |
| 053614 | 000000 | | |
| 053616 | 000000 | K: | 0,0 |
| 053620 | 000000 | | |
| 053622 | 000000 | FR: | 0,0 |
| 053624 | 000000 | | |
| 053626 | 000000 | CONWOR: | 0 |
| 053630 | 000000 | AVG: | 0,0 |
| 053632 | 000000 | | |
| 053634 | 000000 | SSLST: | 0 |
| 053636 | 000000 | SSLST1: | 0 |
| 053640 | 000000 | SSLSTR: | 0,0 |
| 053642 | 000000 | | |
| 053644 | 000000 | LOOP: | 0 |
| 053646 | 000000 | STKST: | 0 |
| 053650 | 000000 | HOLD: | |
| 053652 | 000000 | HOLD1: | 0 |
| 053654 | 000000 | HOLD2: | 0 |
| 053656 | 000000 | HOLD3: | |
| 053660 | 000000 | HOLD4: | 0 |
| 053662 | 000000 | HOLD5: | 0 |
| 053664 | 000000 | HOLD6: | 0 |
| 053666 | 000000 | HOLD7: | 0 |
| 053670 | 000000 | HOLD8: | 0 |
| 053672 | 000000 | HOLD9: | 0 |
| 053674 | 000000 | INTSAM: | 0 |
| | 000001 | .END | |
| | RQ at GE | | 025 |

SYMBOL TABLE LISTING

| | | | | | | | | |
|---|---|---|---|---|---|---|---|---|
| A | | AB | 053302 | ABC | 053316 | AC | 053374 | |
| ACRILK | 053606 | ACRILO | 052314 | ASK | 050060 | AVG | 053630 | |
| B | 052214 | BBUFF | 053450 | BUFF | 053456 | BUFFER | 050250 | |
| CALC | 051044 | CALL | 051714 | CK | 050746 | CNTU | 051604 | |
| CONTIN | 052246 | CONWOR | 053626 | CR | 053436 | CRLF | 053440 | |
| DATA | = 177552 | DFLOAT | 051766 | ERRSW | 053572 | FR | 053622 | |
| HOLD | 053650 | HOLD1 | 053652 | HOLD2 | 053654 | HOLD3 | 053656 | |
| HOLD 4 | 053660 | HOLD5 | 053662 | HOLD6 | 053664 | HOLD7 | 053666 | |
| HOLD8 | 053670 | HOLD9 | 053672 | HPREMP | 052312 | INIT | 052376 | |
| INT | 050722 | INTS | 053510 | INTSA | 053512 | INTSAM | 053674 | |
| K | 053616 | LAR | 051634 | LARGE | 051436 | LE | 053602 | |
| LINK | 050716 | LKS | = 177550 | LOOP | 053644 | LOOP1 | 052310 | |
| LOS | 053612 | MORE | 050076 | MR | 052112 | MTABLE | 050356 | |
| MULTY | 052100 | N | 053550 | NEWDAT | 053252 | NOD27 | 052042 | |
| NOM27 | 052030 | N1 | 053552 | OFFDAC | 052306 | OFFSET | = 177554 | |
| ONEF | = 040200 | OUT | 177554 | OUT1 | 053416 | OVER27 | 052012 | |
| OVR | 051410 | PC | = %000007 | POS27 | 052020 | PREV | 053566 | |
| READ | = 000011 | RESET | 052134 | RESETA | 052172 | RESTOR | 052356 | |
| RTRN | 052076 | R0 | = %000000 | R1 | = %000001 | R2 | = %000002 | |
| R3 | = %000003 | R4 | = %000004 | R5 | = %000005 | R6 | = %000006 | |
| SAMPLE | 050736 | SAMS01 | 053556 | SAV | 052352 | SAVE | 052330 | |
| SAV1 | 052354 | SE | 053576 | SET | = 177550 | SIXF | = 040700 | |
| SP | = %000006 | SSLST | 053634 | SSLSTR | 053640 | SSLST1 | 053636 | |
| START | 050000 | STKST | 053646 | TABLE | 050450 | TABLEZ | 050714 | |
| TABLE1 | 050400 | TABLE2 | 050472 | TABLE3 | 050506 | TABLE4 | 050522 | |
| TABLE5 | 050544 | TABLE6 | 050570 | TABLE7 | 050604 | TABLE8 | 050630 | |
| TABLE9 | 050662 | TEM | 053502 | TEMP | 053562 | TEST | 053236 | |
| TSTE | 051446 | TWOF | = 040400 | UPDAT | 053506 | UPDATE | 051516 | |
| WAIT | 053424 | WAITR | = 000004 | WAITT | 050116 | WATHO | 052226 | |
| WBUFFE | 050104 | WRITE | = 000012 | X | 053520 | XY | 053534 | |
| XYC | 053540 | X1 | 053530 | X2 | 053514 | | | |
| YC | 053544 | ZER27 | 052074 | $ADR | = 057452 | $CMR | = 060206 | |
| $DVR | = 063500 | $GCO | = 061664 | $IR | = 064146 | $MLI | = 064232 | |
| $MLR | = 064412 | $NGR | = 064772 | $POLSH | = 065146 | $RCI | = 060264 | |
| $RI | = 065024 | $SBR | = 057446 | . | = 053676 | | | |
| 000000 | ERRORS | | | | | | | |

*S

From the foregoing disclosure, it can be seen that the instant invention provides an improved weigh feeding apparatus, wherein the discharge rate of a substance from a container may be maintained at a preselected constant value, wherein the container may be automatically refilled during the continuous discharge of the substance, wherein excessive excursions of the system are eliminated, wherein extraneous data recordings are eliminated when calculating the flow rate, and wherein past flow rate values may be stored in memory and compensated for at a later point in time.

Although a certain particular embodiment of the invention has been herein disclosed for purposes of explanation, various modifications thereof, after study of the specification, will be apparent to those skilled in the art to which the invention pertains.

What is claimed and desired to be secured by letters patent is:

1. A weigh feeding apparatus comprising a container for a prefilled substance, means for discharging said substance from said container at a controllable rate; means for weighing said container prefilled with said substance; means coupled to said weighing means for producing a first electrical signal proportional in amplitude to the weight determined by said weighing means; high gain amplifier means for amplifying said first electrical signal, an analog-digital converter coupled to said amplifier means, digital computer means coupled to said analog-digital converter for computing and outputting a signal corresponding to the signal received, digital-analog converter ramp offset means controlled by said computer output signal, having a controlled stepping output applied as a second input signal to said amplifier means to algebraically combine with said first electrical signal, each step corresponding to one time cycle of operation thereby to maintain the output of said amplifier in a given preselected range of amplitude during said one time cycle of operation, said computer means being adapted to compute a corrective signal based on said signal received, and means coupled between said computer means and said means for discharging said substance from said container for controlling the rate of discharge responsive to said corrective signal.

2. A weigh feeding apparatus according to claim 1 further comprising means for inputting into said computer means a preselected feed rate, said computer means being adapted to store in memory a series of said signals received from said analog-digital converter for each of said time cycles of operation and computing said corrective signal by comparing said signals received with said preselected feed rate.

3. A weigh feeding apparatus according to claim 2 wherein said computer means is adapted to maintain said corrective signal constant during the time when a preselected number of said signals received from said analog-digital converter exceeds preselected upper or lower limits, during one time cycle of operation.

4. A weigh feeding apparatus according to claim 2 wherein said computer means is further adapted to compute said corrective signal disregarding a preselected number of said signals received from said analog-digital converter exceeding preselected upper or lower limits, during one time cycle of operation, when computing said corrective signal.

5. A weigh feeding apparatus according to claim 2 further comprising means for correcting said signal received to compensate for errors due to extraneous noise.

6. A weigh feeding apparatus according to claim 5 wherein said means for correcting said signal received includes shaft encoder means coupled between said means for discharging said substance from said container and said digital computer means.

7. A weigh feeding apparatus comprising a container for a prefilled substance, means for discharging said substance from said container at a controllable rate; means for weighing said container prefilled with said substance; means coupled to said weighing means for producing a first electrical signal proportional in amplitude to the weight determined by said weighing means; first amplifier means for amplifying said first electrical signal, a first analog-digital converter coupled to said first amplifier means, digital computer means coupled to said first analog-digital converter for computing a first output signal corresponding to the weight of said substance in said container, second amplifier means for amplifying the signal received from said first amplifier means, a second analog-digital converter coupled to said second amplifier means, said digital computer means being coupled to said second analog-digital converter, said couputer means being adapted to compute a corrective signal based on said signal received from said second analog-digital converter, and means coupled between said computer means and said means for discharging said substance from said container for controlling the rate of discharge responsive to said corrective signal.

8. A weigh feeding apparatus according to claim 7 further comprising under-weight limit input means to said computer means, and over-weight limit input means to said computer means, said computer means being adapted to actuate alarm means when said signals received from said first analog-digital converter exceed one of said limits.

9. A weigh feeding apparatus according to claim 7 further comprising means for inputting into said computer means a preselected feed rate, said computer means being adapted to integrate said preselected feed rate with respect to time and output a display corresponding to the desired total feed commanded, said computer means being further adapted to integrate the actual total weight of material fed as determined by the signal received from said first analog digital converter means and, by comparing said total feed commanded to said actual total weight of material fed, adjust said corrective signal.

10. A weigh feeding apparatus according to claim 7 further comprising means for inputting into said computer means a preselected feed rate, said computer means being adapted to store in memory a series of said signals received from said second analog-digital converter means for each of said time cycles of operation and compute said corrective signal by comparing said signals received with said feed rate; electrically actuated means for refilling said container, means for inputting into said computer means a preselected low level of value corresponding to the desired minimum level of substance in said container; means for inputting into said computer means a preselected out of low level value corresponding to the desired maximum level of substance in said container; said computer means being adapted to compare the actual weight of substance in said container as determined by the signal received from said first analog-digital converter means with the preselected low level value and when said values coincide search said corrective signal until said corrective signal is within preselected deviation limits, and when the corrective signal is within said preselected limits, acutating said means for refilling said container while maintaining said corrective signal constant, and when the actual weight of sbustance in said container as determined by the signal received from said first analog-digital converter reaches said preselected out of low level value, said means for refilling said container being disengaged and said corrective signal being again actuated.

11. A weigh feeding apparatus according to claim 7 wherein said means for discharging said substance from said container comprises an electric motor, means interconnecting said motor with said computer means to input into said computer means the rotational speed of said motor, and input means to said computer means to preselect a desired rotation speed of said motor, switching input means for said computer means to selectively control said corrective signal by comparing the actual motor speed with the desired motor speed.

12. A weigh feeding apparatus comprising a container for a prefilled substance, means for discharging said substance from said container at a controllable rate; means for weighing said container prefilled with said substance; means coupled to said weighing means for producing a first electrical signal proportional in amplitude to the weight determined by said weighing means; first amplifier means for amplifying said first electrical signal, a first analog-digital converter coupled to said first amplifier means, digital computer means coupled to said first analog-digital converter for computing a first output signal correspnding to the weight of said substance in said container, second amplifier means for amplifying the signal received from said first amplifier means, a second analog-digital converter coupled to said second amplifier means, said digital computer means being coupled to said second analog-digital converter for computing and outputting a signal corresponding to the input signal received from said second analog-digital converter, digital-analog converter ramp offset means, controlled by said second computer output signal, having a controlled stepping output applied as a second input signal to said second amplifier means to algebraically combine with said input to said second amplifier means form said first amplifier means, each step corresponding to one time cycle of operation thereby to maintain the output of said second amplifier in a given preselected range of amplitude during said one time cycle of operation, said computer means being adapted to compute a corrective signal based on said signal received from said second analog-digital converter, and means coupled between said computer means and said means for discharging said substance from said container for controlling the rate of discharge responsive to said corrective signal.

13. A weigh feeding apparatus according to claim 12 further comprising means for inputting into said computer means a preselected feed rate value, said computer means being adapted to store in memory a series of said signals received from said second analog-digital converter for each of said time cycles of operation and computing said corrective signal by comparing said signals received with said preselected feed rate value.

14. A weigh feeding apparatus according to claim 12 wherein the output from said first amplifier means ranges between about −10 volts when the container is full to about +10 volts when the container is empty.

15. A weigh feeding apparatus according to claim 12 wherein the output from said second amplifier means ranges between about +5 volts and −5 volts during one time cycle of operation.

16. A weigh feeding apparatus comprising container means, means for discharging a substance from said container means at a controllable rate, means for detecting the weight of the substance being discharged from said container means, means coupled to said detecting means for producing electrical signals proportional to the weight determined by said detecting means, an analog-digital converter for receiving said electrical signals, digital computer means coupled to said analog-digital converter for computing a corrective signal based on the signals received, means coupled between said computer means and said means for discharging said substance from said container for controlling the rate of discharge responsive to the corrective signal, means for inputting into said computer means a preselected feed rate, said computer means being adapted to store a series of the signals received from said analog-digital converter for a time cycle of operation and computing said corrective signal by comparing said signals received with said preselected feed rate, said computer means being adapted to maintain said corrective signal constant during the time when a preselected number of said signals received from said analog-digital converter exceeds preselected upper or lower limits, during one time cycle of operation.

17. A weigh feeding apparatus according to claim 16 wherein said computer means is further adapted to compute said corrective signal disregarding a preselected number of said signals received from said analog-digital converter exceeding preselected upper or lower limits, during one time cycle of operation, when computing said corrective signal.

18. A weigh feeding apparatus according to claim 16 further comprising means for correcting said signal received to compensate for errors due to extraneous noise.

19. A weigh feeding apparatus according to claim 16 wherein said means for correcting said signal received includes shaft encoder means coupled between said means for discharging said substance from said container and said digital computer means.

20. A weigh feeding apparatus comprising a container for prefilling with a substance, means for discharging said substance from said container at a controllable rate, means for weighing said container prefilled with said substance, means coupled to said weighing means for producing electrical signals proportional to the weight determined by said weighing means, an analog-digital converter for receiving said electrical signals, digital computer means coupled to said analog-digital converter for computing a corrective signal based on the signals received, means coupled between said computer means and said means for discharging said substance from said container for controlling the rate of discharge responsive to the corrective signal, means for inputting into said computer means a preselected feed rate, said computer means being adapted to store a series of the signals received from said analog-digital converter for a time cycle of operation and computing said corrective signal by comparing said signals received with said preselected feed rate, said computer means being adapted to maintain said corrective signal constant during the time when a preselected number of said signals received from said analog-digital converter exceeds preselected upper or lower limits, during one time cycle of operation.

* * * * *